US012742754B2

(12) United States Patent
Goodwin et al.

(10) Patent No.: US 12,742,754 B2
(45) Date of Patent: Sep. 22, 2026

(54) CHARGE DETECTION MASS SPECTROMETRY USING MULTIPLE ACCUMULATION EVENTS

(71) Applicant: Thermo Finnigan LLC, San Jose, CA (US)

(72) Inventors: Michael P. Goodwin, Santa Clara, CA (US); Michael W. Senko, Sunnyvale, CA (US)

(73) Assignee: Thermo Finnigan LLC, San Jose, CA (US)

( * ) Notice: Subject to any disclaimer, the term of this patent is extended or adjusted under 35 U.S.C. 154(b) by 299 days.

(21) Appl. No.: 18/434,525

(22) Filed: Feb. 6, 2024

(65) Prior Publication Data

US 2025/0251370 A1 Aug. 7, 2025

(51) Int. Cl.
*G01N 30/72* (2006.01)
*B01D 15/36* (2006.01)
*H01J 49/42* (2006.01)
*G01N 30/02* (2006.01)

(52) U.S. Cl.
CPC ......... *G01N 30/7233* (2013.01); *B01D 15/36* (2013.01); *H01J 49/421* (2013.01); *H01J 49/425* (2013.01); *G01N 2030/027* (2013.01)

(58) Field of Classification Search
CPC ............................ G01N 30/7233; B01D 15/36
See application file for complete search history.

(56) References Cited

U.S. PATENT DOCUMENTS 7,982,181 B1 * 7/2011 Senko .................... G01N 30/72 250/281
2014/0142865 A1 * 5/2014 Wright .................. G16C 20/20 702/23

(Continued)

FOREIGN PATENT DOCUMENTS

WO 2018134346 A1 7/2018
WO 2020219605 A1 10/2020
WO 2023076583 A1 5/2023

OTHER PUBLICATIONS

European Search Report received in EP Application No. 25151202 on Jun. 5, 2025.

(Continued)

*Primary Examiner* — Hugh Maupin

(57) ABSTRACT

A system for charge detection mass spectrometry (CDMS) performs a process including subdividing an m/z range of interest into a plurality of m/z windows; determining an ion population control parameter for each m/z window; accumulating, in the ion store by one or more accumulation events, a population of ions derived from a sample; transferring the population of ions to a mass analyzer; and mass analyzing the population of ions to acquire a CDMS spectrum of the population of ions. Each accumulation event corresponds to a distinct m/z window of the plurality of m/z windows. The ion population control parameter for each m/z window regulates a quantity of ions accumulated in an ion store during an accumulation event. During each accumulation event, ions within the m/z window corresponding to the accumulation event are accumulated in the ion store based on the ion population control parameter for the corresponding m/z window.

20 Claims, 12 Drawing Sheets

(56) References Cited

U.S. PATENT DOCUMENTS

| | | | | |
|---|---|---|---|---|
| 2016/0005581 | A1* | 1/2016 | Graichen | H01J 49/0031 250/288 |
| 2016/0233078 | A1 | 8/2016 | Hauschild et al. | |
| 2017/0125235 | A1* | 5/2017 | Green | H01J 49/4215 |
| 2018/0277346 | A1 | 9/2018 | Rusinov et al. | |
| 2019/0004062 | A1* | 1/2019 | McGee | G01N 33/6848 |
| 2021/0210331 | A1 | 7/2021 | Senko et al. | |
| 2021/0210332 | A1* | 7/2021 | Jarrold | H01J 49/027 |
| 2022/0246414 | A1 | 8/2022 | Senko et al. | |
| 2022/0260534 | A1* | 8/2022 | Zubarev | H01J 49/004 |

OTHER PUBLICATIONS

Aizikov, K., et al., "Use of the filter diagonalization method in the study of space charge related frequency modulation in Fourier transform ion cyclotron resonance mass spectrometry". Journal of the American Society for Mass Spectrometry, Elsevier Science Inc, US, vol. 17, No. 6, Jun. 1, 2006 (Jun. 1, 2006), pp. 836-843, XP036447002, ISSN: 1044-0305, DOI: 10.1016/J.JASMS.2006.02.018.

Arnaud, C., "Charge detection mass spectrometry measures molecular structures too big for regular mass spec", Sep. 16, 2019 | A version of this story appeared in vol. 97, Issue 36. https://cen.acs.org/analytical-chemistry/mass-spectrometry/Charge-det.

Contino, N., et al., "Charge detection mass spectrometry for single ions with a limit of detection of 30 charges". Int. J. Mass Spectrom., 2013, 345-347, 153-159.

Draper, B., et al., "Real-Time Analysis and Signal Optimization for Charge Detection Mass Spectrometry". Chemistry Department, Indiana University, 800 E Kirhvood Ave, Bloomington, IN 47405, USA. J. Am. Soc. Mass Spectrom. (2019) 30:898-904. DOI: 10.1007/s13361-019-02172-z.

International Search Report mailed Jan. 3, 2023 in International Application No. PCT/US2022/048203.

Kafader J., et al., "Measurement of Individual Ions Sharply Increases the Resolution of Orbitrap Mass Spectra of Proteins". Anal. Chem. 2019, 91, 4, 2776-2783.

Kafader, J., et al., "Individual Ion Mass Spectrometry Enhances the Sensitivity and Sequence Coverage of Top Down Mass Spectrometry". J Proteome Res. Mar. 6, 2020; 19(3): 1346-1350. doi:10.1021/acs.jproteome.9b00797.

Kafader, J., et al., "Multiplexed Mass Spectrometry of Individual Ions Improves Measurement of Proteoforms and Their Complexes". Nat Methods. Apr. 2020 ; 17(4): 391-394. doi:10.1038/s41592-020-0764-5.

Kafader, J., et al., "STORI Plots Enable Accurate Tracking of Individual Ion Signals". J. Am. Soc. Mass Spectrom. (2019) 30:2200Y2203. DOI: 10.1007/s13361-019-02309-0.

Mcgee, J., et al., "Automated Control of Injection Times for Unattended Acquisition of Multiplexed Individual Ion Mass Spectra". https://www.ncbi.nlm.nih.gov/pmc/articles/PMC9969899/. Anal Chem. Dec. 6, 2022; 94(48): 16543-16548. doi:10.1021/acs.analchem.2c03495.

Rusinov, A., et al., "Protein Analysis by Electrospray-Orbital Frequency Analyzer with Charge Detection Mass Spectrometry Algorithm", Journal of the American Society for Mass Spectrometry, US, vol. 32, No. 5, Apr. 19, 2021 (Apr. 19, 2021), pp. 1145-1154, XP055894003, ISSN: 1044-0305, DOI: 10.1021 /jasms.0c00445.

Busch, K. "Space Charge in Mass Spectrometry". Mass Spectrometry Forum. Jun. 2004 19(6) Spectroscopy.

Mcgee, J., et al. "Automatic Ion Control for Advanced Throughput in Image Current Charge Detection Mass Spectrometry". Figures. Departments of Chemistry and Molecular Biosciences, Department of Chemical and Biological Engineering, the Chemistry of Life Processes Institute, the Proteomics Center of Excellence at Northwestern University, Evanston, Illinois 60208, United States. Thermo Fisher Scientific, San Jose, California 95134, United States. Integrated Protein Technologies, San Jose, California 95134, United States.

Rathore, A., et al. "Charge Detection Mass Spectrometry: What's the "Big" Deal?". LCGC North America. Mar. 2022. vol. 40. Issue 3. pp. 125-127. https://doi.org/10.56530/lcgc.na.gp8165g1.

Thermo Fisher Scientific. "Direct Mass Technology Mode". Decipher complexity with clarity. Copyright 2006-2024 Thermo Fisher Scientific Inc. thermofisher.com/DirectMass Technology.

* cited by examiner

Fig. 5

CHARGE DETECTION MASS SPECTROMETRY USING MULTIPLE ACCUMULATION EVENTS

BACKGROUND INFORMATION

In the early days of mass spectrometry, all ion sources produced singly charged ions exclusively. Although mass spectrometers measure the mass-to-charge ratio (m/z) of ions, determination of mass was simple because the charge (z) was always equal to one (1). When mass spectrometry was combined with an ion source that produces multiply charged ions (e.g., an electrospray ionization source), the determination of mass was rendered more challenging. If the charge on an ion is ambiguous, so is the calculated mass. The original solution to this problem was to use the m/z spacing between adjacent charge state peaks of the same mass. With the development of high-resolution mass analyzers, it became more common to determine charge by measuring the m/z spacing between adjacent isotopic peaks, since these are known to be one (1) Dalton apart. Both of these methods of determining charge are challenged by highly complex spectra, where neither clear charge state nor isotopic distributions can be easily discerned.

One solution to resolve the charge ambiguity is the use of Charge Detection Mass Spectrometry (CDMS). In some implementations of CDMS, ions are analyzed one at a time, with a detector that is capable of simultaneously sensing both the m/z and charge z of each ion. This has traditionally been performed with an Electrostatic Linear Ion Trap (ELIT), where an image current detector is placed between a pair of ion mirrors, allowing the ion to pass through the detector numerous times, improving sensitivity and charge assignment precision. ELITs operate best with just a single ion, since the m/z resolution is generally poor and ion-ion interactions can perturb trajectories, limiting ion lifetimes.

For ions which have enough charge to generate a detectable signal in a single pass, the ELIT may be operated in a triggered mode, where an optical gate between the source and ELIT is opened to allow ions to enter, and this gate is closed as soon as the first ion passes through the detector. However, most ions do not carry enough charge to be detected on a single pass. In these cases, the open time for the gate is set to an average time that most commonly results in one ion being trapped. This is somewhat inefficient, in that ion arrival times are randomly distributed, so the probability of seeing zero or two ions is just as high as seeing one ion. Therefore, on average, a single ion is detected in less than 50% of spectra.

Recently, orbital electrostatic trap mass analyzers (in the form of Orbitrap™ mass analyzers, manufactured and sold by Thermo Fisher Scientific, Inc., Waltham, MA) have been used for CDMS. Some of these implementations of CDMS are referred to as individual ion mass spectrometry (I2MS) or Direct Mass Technology™ (DMT, Thermo Fisher Scientific, Inc., Waltham, MA). Due to the nature of orbital electrostatic trap mass analyzers, with both high resolution and high space charge tolerance, hundreds of individual ions may be detected simultaneously, and this multiplexing significantly increases the rate at which statistically meaningful data can be acquired, even for complex analyte mixtures. A particular implementation of CDMS involves processing the transient signal generated by the axial oscillations of a population of ions to produce a set of Selective Temporal Overview of Resonant Ions (STORI) plots. The slope of each STORI plot is proportional to the charge of a different ion species in the analyzed ion population, and the charge of the ion may be determined by a slope-to-charge calibration function. Using the determined charge z and m/z of each ion species, a true mass spectrum may be generated that plots detected signal as a function of mass (m).

With the ability to multiplex ion measurements with an orbital electrostatic trap mass analyzer, it is possible to observe too many ions in each spectrum. In orbital electrostatic trap mass spectrometers in which the CDMS method is practiced, ions generated by the ion source are transferred, via ion optics, to an ion trap (alternatively referred to as an ion store) prior to mass analysis in the orbital electrostatic trap mass analyzer. The duration over which the ions are accumulated in the ion trap (often referred to as the ion injection time, accumulation time, ion accumulation time, or ion fill time) determines the number of ions measured by the orbital electrostatic trap mass analyzer. In CDMS, each detected signal within a spectrum is resolved from every other signal in that spectrum along the m/z domain. If signals overlap in m/z, it becomes difficult to determine whether there are multiple individual ions contributing to the signal, or one ion of the summed charge of the individual ions. For example, where two or more ions of the same m/z are detected simultaneously, the charge state becomes ambiguous because only the net charge of all ions at that m/z is known, and not the charge on each ion or even the actual number of ions. In a less severe case, ions of resolved but neighboring m/z's may reduce the precision of the charge determination because the signals will constructively and destructively interfere with one another, which may impact the determination of signal strength and make proper assignment of charge difficult.

To minimize overlap and interference between signals in the m/z domain, the ion population measured in each spectrum should be controlled to achieve individual-ion resolution wherein the mass analyzer is not loaded with ions of the same or similar m/z values. However, the use of limited ion populations increases the number of spectra for representative sampling and thereby lengthens the time to perform CDMS for a sample. Thus, under ideal conditions, a large number of ions would be observed in each spectrum, such that the acquisition of the full data set can be completed in the shortest time possible, but the number of ions in any one spectrum is not so large as to cause interference between adjacent or overlapping signals.

Automatic Gain Control (AGC) is a technique that has been used to balance between spectral dynamic range and space charge effects in trapped ion mass spectrometers. However, AGC is less than ideal for CDMS because AGC measures the total signal (e.g., total ion current (TIC)) in an acquired spectrum to regulate subsequent accumulation times to reach a target total signal. In CDMS, the total signal is proportional to the sum of charge states on all ions. If the charge states of the analyte ion are unknown before the experiment, it is not possible to select an appropriate target signal. Thus, there remains a clear need in the mass spectrometry art for an automated ion accumulation time selection technique that is suitable for use with CDMS data acquisition in the individual ion regime.

SUMMARY

The following description presents a simplified summary of one or more aspects of the methods and systems described herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some illustrative embodiments, a system for charge detection mass spectrometry (CDMS), comprises: one or more processors; and memory storing executable instructions that, when executed by the one or more processors, cause a computing device to direct a mass spectrometer to perform a process comprising: subdividing a mass-to-charge ratio (m/z) range of interest into a plurality of m/z windows; determining an ion population control parameter for each m/z window, wherein the ion population control parameter for each m/z window regulates a quantity of ions accumulated in an ion store during an accumulation event; accumulating, in the ion store by one or more accumulation events each corresponding to a distinct m/z window of the plurality of m/z windows, a population of ions derived from a sample, wherein during each accumulation event ions within the m/z window corresponding to the accumulation event are accumulated in the ion store based on the ion population control parameter for the corresponding m/z window; transferring the accumulated population of ions to a mass analyzer; and mass analyzing the population of ions to acquire a CDMS spectrum of the population of ions.

In some illustrative embodiments, a non-transitory computer-readable medium storing instructions that, when executed, direct at least one processor of a computing device for charge detection mass spectrometry to perform a process comprising: subdividing a mass-to-charge ratio (m/z) range of interest into a plurality of m/z windows; determining an ion population control parameter for each m/z window, wherein the ion population control parameter for each m/z window regulates a quantity of ions accumulated in an ion store during an accumulation event; directing accumulation, in the ion store by one or more accumulation events each corresponding to a distinct m/z window of the plurality of m/z windows, of a population of ions derived from a sample, wherein during each accumulation event ions within the m/z window corresponding to the accumulation event are accumulated in the ion store based on the ion population control parameter for the corresponding m/z window; directing transfer of the accumulated population of ions to a mass analyzer; and directing mass analysis of the population of ions to acquire a CDMS spectrum of the population of ions.

In some illustrative embodiments, a system for charge detection mass spectrometry (CDMS), comprising: an ion store that accumulates, by one or more accumulation events, a population of ions derived from a sample; a mass analyzer that acquires, by CDMS, a mass spectrum of the accumulated population of ions after the accumulated population of ions is transferred to the mass analyzer; a mass filter that selectively transmits ions derived from the sample based on m/z of the ions; and a computing device configured to perform a process comprising: subdividing a mass-to-charge ratio (m/z) range of interest into a plurality of m/z windows, wherein each accumulation event of the one or more accumulation events corresponds to a distinct m/z window of the plurality of m/z windows; determining an ion population control parameter for each m/z window, wherein the ion population control parameter for each m/z window regulates a quantity of ions accumulated in the ion store during a corresponding accumulation event; and directing accumulation, in the ion store by the one or more accumulation events, of the population of ions derived from the sample, wherein during each accumulation event ions within the m/z window corresponding to the accumulation event are accumulated in the ion store based on the ion population control parameter for the corresponding m/z window.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 5 shows an illustrative method of performing automatic ion control according to a summed-intensity approach.

DETAILED DESCRIPTION

Figure 1:
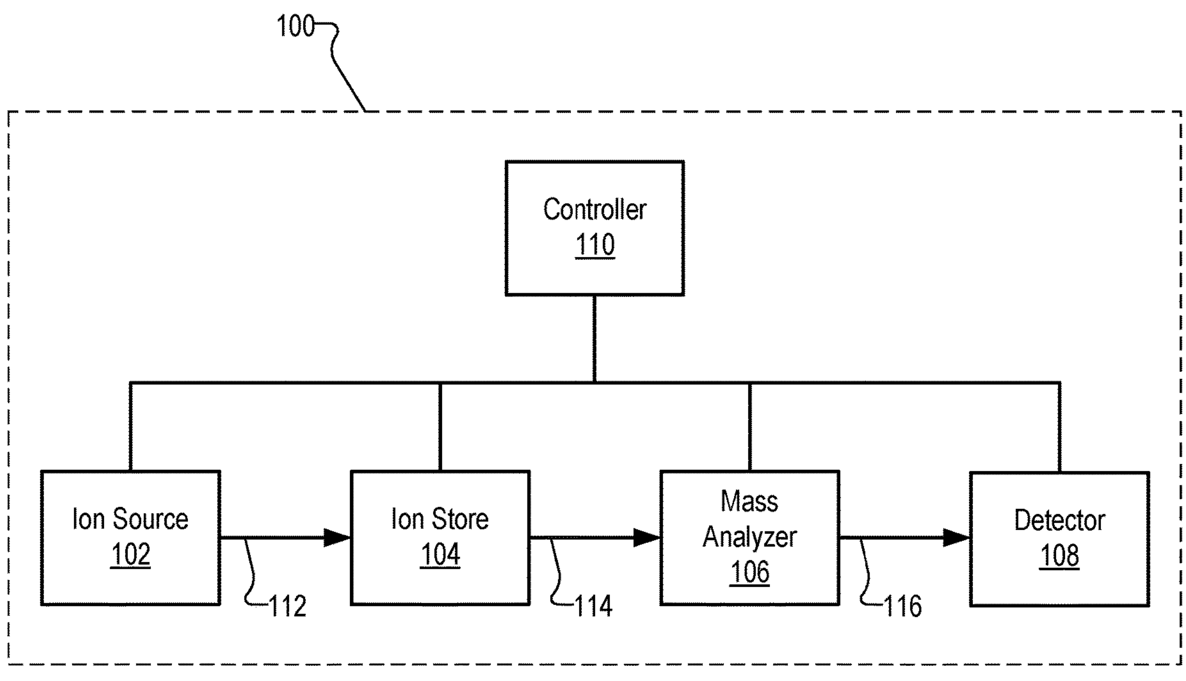
FIG. 1 shows an illustrative implementation of a mass spectrometer.

Described herein are methods, systems, and apparatuses for performing CDMS with increased sample throughput and increased data quality as compared with conventional CDMS techniques. The CDMS techniques described herein subdivide an m/z range of interest into multiple distinct m/z windows and accumulate a population of ions in an ion store in multiple distinct accumulation events to achieve a more uniform signal density across the m/z space of an incoming ion beam. Each accumulation event corresponds to a distinct m/z window, and an ion population control parameter is independently determined for each m/z window to accumulate a desired number of ions during each accumulation event. The ion population control parameter regulates a population of ions analyzed by the mass analyzer during an acquisition event. In some examples, the ion population control parameter for each m/z window is independently determined by automatic ion control (AIC) techniques described herein.

By regulating the accumulation of ions in multiple, distinct accumulation events that, in the aggregate, cover an m/z range of interest, the probability of detecting ions in less dense m/z regions of the incoming ion beam is increased while the probability of multiple ion events and interferences in the higher density m/z regions is reduced. Thus, the accumulation of ions in the ion store is not bottlenecked by the densest m/z regions and more ions per unit time can be analyzed, thus increasing sample throughput without reducing data quality. Additionally, the data quality may be higher than conventional CDMS techniques since the CDMS techniques using multiple accumulation events, as described herein, better characterize the regions of m/z space of the incoming ion beam that have less signal density.

Before describing the multiple accumulation event approach for CDMS, methods, systems, and apparatuses for AIC will be described. In some examples, the AIC methods, systems, and apparatuses described herein are used for CDMS analysis. The AIC techniques described herein determine the ion population control parameter based on a signal density metric since the probability of having interfering signals is related to the signal density in the m/z domain. Mass spectra with high signal density are more likely to have overlapping or closely spaced peaks in the m/z domain, while mass spectra with low signal density are less likely to have these interferences. The ion population control parameter may be adjusted so that the signal density, as measured from an acquired mass spectrum, approaches or is sufficiently close to a target signal density. The target signal density is a predetermined value that may be chosen to obtain, for the particular experiment conditions and objectives, an appropriate number of ions within each spectrum while limiting the occurrence of interfering ions to an acceptably low amount.

In some examples, a method of performing AIC includes acquiring a mass spectrum that includes a plurality of peaks representing intensity as a function of m/z of a population of ions analyzed by a mass analyzer during an acquisition event. A measured signal density of the mass spectrum is determined based on the mass spectrum. In some examples, the measured signal density is determined according to a peak-spacing approach. In other examples, the measured signal density is determined according to a summed-intensity approach. The ion population control parameter for a subsequent acquisition event is set based on the measured signal density and a target signal density. The ion population control parameter regulates a population of ions analyzed by the mass analyzer during an acquisition event. In some examples, the ion population control parameter is the accumulation time over which ions are accumulated in an ion store prior to being analyzed by the mass analyzer. In other examples, the ion population control parameter is the electric potential applied to ion optics (e.g., a lens) that regulate a flux of ions delivered to the mass analyzer.

In the peak-spacing approach, determining the measured signal density of the mass spectrum includes calculating a peak spacing value for each set of adjacent peaks included in a selected m/z range of the mass spectrum (e.g., an m/z range of interest). Based on a set of the calculated peak spacing values, a global peak spacing value for the selected m/z range is determined. In the summed-intensity approach, determining the measured signal density includes determining an occupied m/z space within the selected m/z range of the mass spectrum. A summed intensity of signals within the occupied m/z space is determined. The measured signal density is determined based on the summed intensity within the occupied m/z space and the occupied m/z space. The peak-spacing approach and the summed-intensity approach will be described below in more detail.

Various embodiments and examples will now be described in more detail with reference to the figures. The methods, systems, and apparatuses described herein provide various benefits that will be made apparent herein. The methods, systems, and apparatuses for performing AIC may be used in conjunction with a mass spectrometer. As such, an illustrative mass spectrometer will now be described. The described mass spectrometer is illustrative and not limiting.

FIG. 1 shows a functional diagram of an illustrative mass spectrometer 100. As shown, mass spectrometer 100 includes an ion source 102, an ion store 104, a mass analyzer 106, a detector 108, and a controller 110. Mass spectrometer 100 may further include any additional or alternative components not shown as may suit a particular implementation (e.g., ion optics, lenses, filters, ion storage devices, ion mobility analyzers, collision cells, ion flux monitor, etc.).

Ion source 102 is configured to produce ions from a sample and deliver the ions in an ion stream 112 to ion store 104. Ion source 102 may use any suitable ionization technique, including without limitation electron ionization, chemical ionization, matrix assisted laser desorption/ionization, electrospray ionization, atmospheric pressure chemical ionization, atmospheric pressure photoionization, inductively coupled plasma, and the like. Ion source 102 may include various components for producing ions from a sample and delivering the ions to ion store 104.

Ion store 104 is a device configured to accumulate, over an accumulation time, ions included in ion stream 112. As used herein, "accumulation time" refers to the duration of time during which ions produced by ion source 102 accumulate in ion store 104 prior to being released and transferred to mass analyzer 106. Accumulation time may also be known as ion injection time or ion fill time. In some examples, ion store 104 is an ion storage device configured to buffer down-stream processes, such as mass analysis, thereby increasing acquisition speed and instrument sensitivity. In some examples, ion store 104 is a beam-type device or a trapping device, such as a multipole ion guide (e.g., a quadrupole ion guide, a hexapole ion guide, an octapole ion guide, etc.), a linear quadrupole ion trap, a three-dimensional quadrupole ion trap, a cylindrical ion trap, a toroidal ion trap, an orbital electrostatic trap, a Kingdon trap, and the like. In some examples, ion store 104 takes the form of a curved trap (also known as a C-trap) of the type used in orbital electrostatic trap mass spectrometers.

In some examples, ion store 104 is a collision cell positioned upstream from mass analyzer 106. As used herein, a "collision cell" may refer to any device arranged to produce product ions via controlled dissociation processes or ion-ion reaction processes and is not limited to devices employed for collisionally-activated dissociation. For example, a collision cell may be configured to fragment the ions using collision induced dissociation (CID), electron transfer dissociation (ETD), electron capture dissociation (ECD), photo-induced dissociation (PID), surface induced dissociation (SID), and the like. A collision cell may be positioned upstream from mass analyzer 106 and/or a mass filter, which separates the fragmented ions based on m/z of the ions.

The accumulation of ions in ion store 104 may be regulated by the AIC methods, apparatuses, and systems described herein to achieve a target population of ions in ion store 104 and, hence, a target signal density. The accumulation of ions may be regulated in any suitable way. In some examples, the accumulation of ions in ion store 104 is regulated by a gate apparatus (not shown) that either transmits or blocks ion stream 112. The gate may be opened for a given amount of time to meter the appropriate number of ions, after which the gate is closed. The accumulated ions may then be transferred in ion stream 114 from ion store 104 to mass analyzer 106. It will be recognized that other techniques for the regulation of ion accumulation may be used.

Mass analyzer 106 is configured to perform a mass analysis of the accumulated ions. Mass analyzer 106 may be implemented by any suitable mass analyzer or combination of analyzers suitable for charge detection mass spectrometry and/or Fourier transform mass spectrometry (FTMS) wherein the image charge signal of ions is induced and recorded. Examples of mass analyzer 106 include, without limitation, an ion trap mass analyzer (e.g., a linear quadrupole ion trap, a three-dimensional quadrupole ion trap, a cylindrical ion trap, a toroidal ion trap, etc.), a time-of-flight (TOF) mass analyzer, an electric sector mass analyzer (e.g., a dual electric sector ion trap with central charge tubes), a linear quadrupole mass analyzer, an electrostatic ion trap mass analyzer (e.g., an orbital electrostatic trap such as an Orbitrap™ mass analyzer, a Kingdon trap, an electrostatic linear ion trap (ELIT), an orbital frequency analyzer (OFA), etc.), a magnetic ion trap, and/or a Fourier transform ion cyclotron resonance (FT-ICR) mass analyzer.

In some examples, mass spectrometer 100 is a tandem mass spectrometer (tandem-in-time or tandem-in-space) configured to perform tandem mass spectrometry (e.g., MS/MS), a multi-stage mass spectrometer configured to perform multi-stage mass spectrometry (also denoted $MS^n$), or a hybrid mass spectrometer. For example, mass analyzer 106 may include multiple mass analyzers, mass filters, and/or collision cells. In some examples, mass analyzer 106 includes a combination of multiple mass filters and/or collision cells, such as a triple quadrupole mass analyzer, where a collision cell is interposed in the ion path between independently operable mass filters. In other examples, mass analyzer 106 includes a ToF mass analyzer and an orbital electrostatic trap mass analyzer positioned in series.

While FIG. 1 shows that ion store 104 is positioned upstream from mass analyzer 106, ion store 104 may be positioned at any other location along an ion path from ion source 102 to detector 108 within a tandem mass spectrometer or multi-stage mass spectrometer (e.g., between a first mass filter (Q1) and a collision cell (Q2) and/or between a collision cell (Q2) and a second mass filter (Q3)). Additionally, mass spectrometer 100 may include more than one ion store 104, such as when mass spectrometer 100 is a tandem mass spectrometer or multi-stage mass spectrometer.

Ion detector 108 is configured to detect ions either within mass analyzer 106 or in ion stream 116 at each of a variety of different m/z and responsively generate an electrical signal representative of ion intensity. The electrical signal is transmitted to controller 110 for processing, such as to construct a mass spectrum of the detected ions. For example, mass analyzer 106 may emit an emission beam of separated ions to detector 108, which is configured to detect the ions in the emission beam and generate or provide data that can be used by controller 110 to construct a mass spectrum. Ion detector 108 may be implemented by any suitable detection device, including without limitation an electron multiplier, a Faraday cup, and the like.

As used herein, "mass spectrum" or "spectrum" refers to a plot of intensity of ions as a function of m/z of the ions. As used herein, "intensity" or "signal intensity" refers to the response of the detector and may represent absolute abundance, relative abundance, ion count, intensity, relative intensity, ion current, or any other suitable measure of ion detection.

Controller 110 is configured to control various operations of mass spectrometer 100. For example, controller 110 may be configured to control operation of various hardware components included in ion source 102, ion store 104, mass analyzer 106, and/or detector 108. To illustrate, controller 110 may be configured to control an accumulation time of ion store 104 and/or mass analyzer 106, control an oscillatory voltage power supply and/or a DC power supply to supply an RF voltage and/or a DC voltage to mass analyzer 106, adjust values of the RF voltage and DC voltage to select an effective m/z (including a mass tolerance window) for analysis, and adjust the sensitivity of ion detector 108 (e.g., by adjusting the detector gain).

Controller 110 may also include and/or provide a user interface configured to enable interaction between a user of mass spectrometer 100 and controller 110. The user may interact with controller 110 via the user interface by tactile, visual, auditory, and/or other sensory type communication. For example, the user interface may include a display device (e.g., liquid crystal display (LCD) display screen, a touch screen, etc.) for displaying information (e.g., mass spectra, notifications, etc.) to the user. The user interface may also include an input device (e.g., a keyboard, a mouse, a touchscreen device, etc.) that allows the user to provide input to controller 110. In other examples, the display device and/or input device may be separate from, but communicatively coupled to, controller 110. For instance, the display device and the input device may be included in a computer (e.g., a desktop computer, a laptop computer, a mobile device, etc.) communicatively connected to controller 110 by way of a wired connection (e.g., by one or more cables) and/or a wireless connection (e.g., Wi-Fi, Bluetooth, near-field communication, etc.).

Controller 110 may include any suitable hardware (e.g., a processor, circuitry, etc.) and/or software as may serve a particular implementation. While FIG. 1 shows that controller 110 is included in mass spectrometer 100 (e.g., one or more on-board processors residing on mass spectrometer 100), controller 110 may alternatively be implemented in whole or in part separately from mass spectrometer 100, such as by a computing device communicatively coupled to mass spectrometer 100 by way of a wired connection (e.g., a cable) and/or a network (e.g., a local area network, a wireless network (e.g., Wi-Fi), a wide area network, the Internet, a cellular data network, etc.).

In the example of FIG. 1, various components of mass spectrometer 100 may be combined into a single component. For example, ion store 104 and mass analyzer 106 may be combined into a single trapping-type mass analyzer in which ions are accumulated over an accumulation time to achieve a target number of ions, after which a mass analysis of the accumulated ions is performed.

In the example of FIG. 1, the population of ions analyzed by mass analyzer 106 may be regulated by adjusting the accumulation time over which ions are accumulated in ion store 104. In alternative examples, the population of ions analyzed by mass analyzer 106 may be regulated by adjusting the electric potential applied to ion optics (e.g., lenses) that regulate an ion flux that is delivered to mass analyzer 106. For example, voltages applied to a lens (not shown in FIG. 1) may be adjusted to focus or defocus ion stream 112 and/or ion stream 114 to reduce or increase the ion population that is delivered to and analyzed by mass analyzer 106. In some examples in which the ion population for downstream processes (e.g., mass analysis) is regulated by ion optics rather than by ion store 104, ion store 104 may be omitted.

The AIC methods, systems, and apparatuses described herein may operate as part of or in conjunction with mass spectrometer 100 described herein and/or with any other suitable mass spectrometer or mass spectrometry system, including a combined separation-mass spectrometry system such as a liquid chromatography-mass spectrometry system (LC-MS), a high-performance liquid chromatography-mass spectrometry (HPLC-MS) system, a gas chromatography-mass spectrometry (GC-MS) system, or a capillary electrophoresis-mass spectrometry (CE-MS) system. The methods, systems, and apparatuses described herein may also operate in conjunction with a continuous flow sample source, such as in flow-injection mass spectrometry (FI-MS) in which analytes are injected into a mobile phase without separation in a column and enter the mass spectrometer.

In some examples, mass spectrometer 100 may be used to perform CDMS. CDMS using orbital electrostatic trap mass analyzers has been described widely in the patent and scientific literature, including in the following publications, all of which are incorporated herein by reference: PCT Publication WO2020/219605 to Senko et al.; Kafader et al., *Multiplexed Mass Spectrometry of Individual Ions Improves Measurements of Proteoforms and Their Complexes*, Nat Methods 2020 Apr. 17(4), pp. 391-94; Kafader et al., *STORI Plots Enable Accurate Tracking of Individual Ion Signals*, J. Am. Soc. Mass Spectrom. (2019) 30:2200-2203; and Kafader et al., *Individual Ion Mass Spectrometry Enhances the Sensitivity and Sequence Coverage of Top Down Mass Spectrometry*, J. Proteome Res. 2020 Mar. 6 19(3) pp. 1346-50. In general, CDMS with an orbital electrostatic trap mass analyzer involves processing the transient signal generated by the axial oscillations of a population of ions within the orbital electrostatic trap mass analyzer to produce a set of Selective Temporal Overview of Resonant Ions (STORI) plots. The slope of each STORI plot is proportional to the charge of a different ion species in the analyzed ion population. The charge of the ion may be determined by a slope-to-charge calibration function. Using the determined charge z and the measured m/z of each ion species, a mass domain spectrum may be generated that plots detected signal as a function of mass m. As used herein, a "mass domain spectrum" or "true mass spectrum" refers to a plot of the intensity of detected ions as a function of mass. Analytes represented in a mass spectrum may be placed in the mass domain by using any suitable CDMS method.

As mentioned, in CDMS each detected signal (also referred to herein as a peak) within a mass spectrum is resolved from every other signal in that spectrum along the m/z domain. If signals overlap in m/z, it becomes difficult to determine whether there are multiple individual ions contributing to the signal, or one ion of the summed charge of the individual ions. As a result, it is difficult to determine the charge of ion species and place the analytes in the true mass domain.

The appropriate number of individual ions that can be acquired within one acquisition is limited by the number of analyte(s) charge state and isotopic channels that can be populated without overlapping in m/z space. Overpopulating these channels (i.e., creating multiple-ion events) would lead to an uncertain charge and, therefore, an uncertain mass assignment for that signal. To minimize the possibility for ambiguous charge assignment, a mass analyzer may be operated with small ion populations (achieved, for example, by short accumulation times or attenuated ion beams), which produce sparse spectra with a low probability for coincidental ions. However, intentionally limiting the ion population will increase the number of acquisitions (i.e., raise the experiment time) needed to produce a statistically relevant mass domain spectrum.

The AIC methods described herein may be used to optimize the number of ions within each spectrum while simultaneously limiting the occurrence of interfering ions that overlap in m/z to an acceptable number and/or to an acceptable m/z region. As used herein, "optimize" and its variants means to seek an improved or optimum solution among a set of possible solutions, although the best solution may not necessarily be obtained, such as when an optimization process is terminated prior to finding the best solution, when multiple solutions exist that satisfy predefined criteria, when a solution satisfies minimum criteria, or when a selected optimization technique is unable to converge on the best solution. Similarly, as used herein an "optimum" parameter (e.g., a "maximum" or "minimum" value of a parameter) means the solution obtained as the result of performing an optimization process, and thus may not necessarily be the absolute extreme value of the parameter (e.g., the absolute maximum or minimum), but still adjusts the parameter and results in an improvement.

Figure 2:
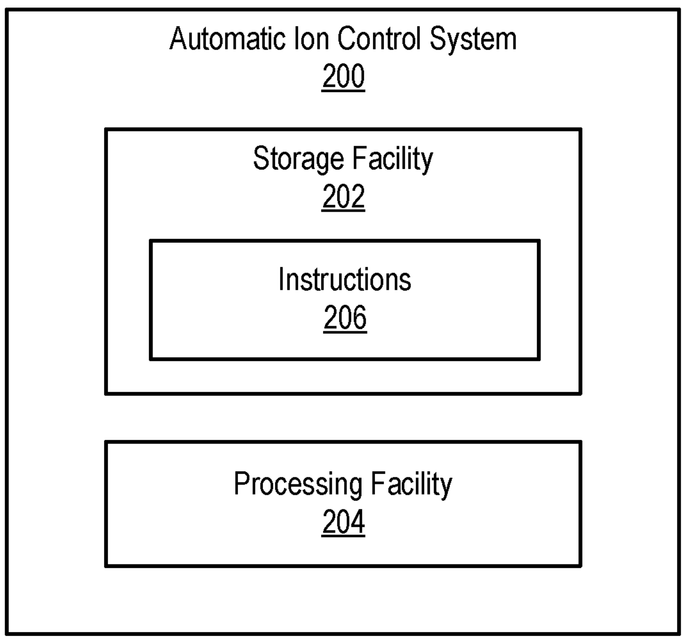
FIG. 2 shows an illustrative automatic ion control system.

One or more operations associated with AIC may be performed by an automatic ion control system. FIG. 2 shows an illustrative automatic ion control system 200 ("system 200"). System 200 may be implemented entirely or in part by mass spectrometer 100 (e.g., by controller 110). Alternatively, system 200 may be implemented separately from mass spectrometer 100 (e.g., by a separate and/or remote computing system or server).

System 200 may include, without limitation, a storage facility 202 and a processing facility 204 selectively and communicatively coupled to one another. Facilities 202 and 204 may each include or be implemented by hardware and/or software components (e.g., processors, memories, communication interfaces, instructions stored in memory for execution by the processors, etc.). In some examples, facilities 202 and 204 may be distributed between multiple devices and/or multiple locations as may serve a particular implementation.

Storage facility 202 may maintain (e.g., store) executable data used by processing facility 204 to perform any of the operations described herein. For example, storage facility 202 may store instructions 206 that may be executed by processing facility 204 to perform any of the operations described herein. Instructions 206 may be implemented by any suitable application, software, code, and/or other executable data instance. Storage facility 202 may also maintain any data acquired, received, generated, managed, used, and/or transmitted by processing facility 204.

Processing facility 204 may be configured to perform (e.g., execute instructions 206 stored in storage facility 202 to perform) various processing operations described herein. It will be recognized that the operations and examples described herein are merely illustrative of the many different types of operations that may be performed by processing facility 204. In the description herein, any references to operations performed by system 200 may be understood to be performed by processing facility 204 of system 200. Furthermore, in the description herein, any operations performed by system 200 include system 200 directing or instructing another computing system, device, or apparatus to perform the operations.

Illustrative methods of performing AIC will now be described. The AIC methods are described herein in connection with CDMS performed with an orbital electrostatic trap mass spectrometer. However, the AIC methods are not to be construed as limited thereto and may be successfully applied to other analytical methods, including other methods of mass spectrometry as well as other methods of CDMS, and/or using any other types of mass analyzers (e.g., TOF mass analyzers, FT-ICR mass analyzers, ELIT mass analyzers, OFAs, electric sector analyzers, etc.).

Figure 3:
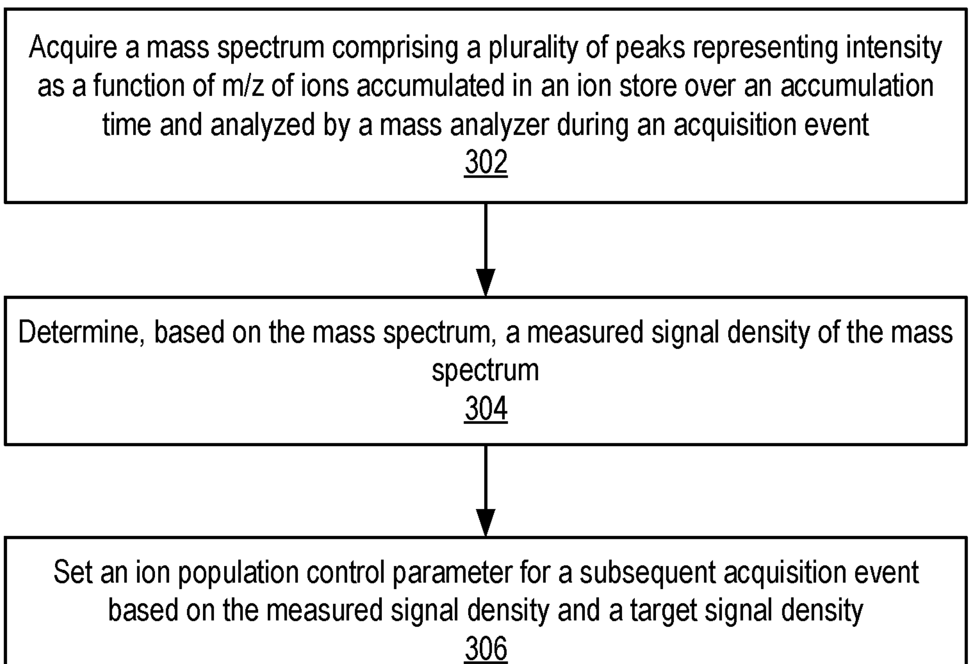
FIG. 3 shows an illustrative method of performing automatic ion control.

FIG. 3 shows an illustrative method 300 of performing AIC. While FIG. 3 shows illustrative operations according to one embodiment, other embodiments may omit, add to, reorder, and/or modify any of the operations shown in FIG. 3. One or more of the operations shown in FIG. 3 may be performed by system 200, any components included therein, and/or any implementations thereof (e.g., by mass spectrometer 100, one or more components of mass spectrometer 100, and/or a remote computing system separate from mass spectrometer 100).

At operation 302, system 200 acquires a mass spectrum that includes a plurality of peaks representing intensity as a function of m/z of a population of ions analyzed by the mass analyzer during an acquisition event. In some examples, the population of ions comprises ions accumulated in an ion store over an accumulation time. In other examples, the population of ions comprises ions within an ion beam that is delivered to the mass analyzer. System 200 may generate the mass spectrum based on signals received from a detector (e.g., detector 108), or the mass spectrum may be generated by mass spectrometer (e.g., controller 110) and provided to system 200. In some examples, the acquisition event is part of an experimental analysis of a sample. In other examples, the acquisition event comprises acquiring a survey spectrum performed prior to an experimental analysis of a sample.

At operation 304, system 200 determines, based on the mass spectrum, a measured signal density of a selected m/z range of the mass spectrum. The selected m/z range may include the entirety of the detection window of the mass spectrum or any portion thereof. In some examples, the selected m/z range is specified by user input and may be a narrow m/z range of interest. As explained above, signal density may be defined and determined according to various different approaches. In a simple approach, AIC regulates the number of signals observed in a spectrum. In this implementation, signal density is the number of peaks divided by the m/z range of the acquisition event. However, this approach may represent an oversimplification. Simply counting the number of signals does not take into consideration the m/z width of peaks, which may influence whether adjacent signals interfere or overlap. Consider a mass spectrum acquired with standard conditions, and one collected with an m/z resolution that is twice that of the first mass spectrum. With the higher resolution mass spectrum, the probability of having overlapping peaks is smaller because each peak consumes less m/z space.

In the peak-spacing approach, signal density generally represents (e.g., is inversely indicative of) the spacing, in units of peak width, between adjacent peaks within the selected m/z range of the mass spectrum. In the peak-spacing approach, the measured signal density is determined from an earlier acquired mass spectrum without regard to signal intensity. Methods for determining the measured signal density of the acquired mass spectrum according to the peak-spacing approach are described below in more detail with reference to FIG. 4. In the summed-intensity approach, signal density generally represents the amount of signal (signal intensity) per unit of m/z space within the selected m/z range of the mass spectrum. In the summed-intensity approach, signal density is determined based on survey spectra performed prior to an experimental run and factors in the intensity of detected signals. Methods for determining the measured signal density of the acquired mass spectrum according to the summed-intensity approach are described below in more detail with reference to FIG. 5. It will be recognized that other approaches for defining and determining the measured signal density are contemplated and are within the scope of method 300.

At operation 306, system 200 sets an ion population control parameter for a subsequent acquisition event based on the measured signal density and a target signal density. The subsequent acquisition event may be the next acquisition event or any other acquisition event that occurs after the acquisition event of operation 302 (e.g., the Nth acquisition event where N is an integer greater than 1). The ion population control parameter regulates the population of ions analyzed by the mass analyzer during the subsequent acquisition event. In some examples, the ion population control parameter is the accumulation time over which the ions are accumulated in the ion store prior to being analyzed by the mass analyzer during the subsequent acquisition event. In other examples, the ion population control parameter is an electric potential applied to ion optics that regulate the flux of ions delivered to the mass analyzer (e.g., delivered to the ion store before transfer to the mass analyzer).

The target signal density is a predetermined value that may be chosen to optimize, for the particular experiment conditions and objectives, the number of ions within each spectrum while limiting the occurrence of interfering ions to an acceptably low amount. The target signal density generally depends on the characteristics and operating parameters (e.g., resolving power) of the mass analyzer, and may in some examples also depend on method parameters and analyte characteristics (e.g., concentration, molecular weight, and/or molecular weight distribution of the analyte ions). In some examples, the target signal density is determined empirically. In other examples, the target signal density is determined based on one or more method parameters, instrument conditions, ion monitoring devices in the instrument, and/or sample or analyte characteristics for the experimental analysis. In some examples, system 200 may allow a user to provide input selecting or setting the target signal density. Alternatively, system 200 may automatically select or set the target signal density based on one or more instrument, method, and/or analyte parameters and/or conditions for the experiment.

In some examples, a user may choose to operate in a mode where the target signal density is well above the signal density that minimizes interferences. For example, the user may be interested in collecting data as quickly as possible, and in these cases it may be advantageous to allow for interferences in high signal density regions in order to increase the number of signals that are observed in low signal density regions. Thus, the user may select a narrow m/z range of interest.

The subsequent acquisition event may be any acquisition event that is performed after the acquisition event of operation 302. For example, in the peak-spacing approach, the subsequent acquisition event may be the next acquisition event performed during an experimental run. In the summed-intensity approach, the subsequent acquisition may be a follow-on survey acquisition.

System 200 may set the ion population control parameter for the subsequent acquisition event based on the measured signal density and the target signal density in any suitable way. Examples of setting the ion population control parameter will now be described with respect to setting the accumulation time. However, the same or similar principles may be applied to setting the electric potential applied to ion optics that regulate the ion flux delivered to the mass analyzer.

In some examples, the relationship between accumulation time and signal density may be assumed to be linear: as the ratio of the target signal density to the measured signal density increases (the "signal density ratio"), the accumulation time increases (assuming that signal density is represented in units that increase with increasing density). For example, the accumulation time for a subsequent acquisition event may be determined in accordance with the following Equation (1):

$$T_{subs} = T_{current} \times \frac{\text{target signal density}}{\text{measured signal density}} \qquad (1)$$

where $T_{subs}$ is the accumulation time for the subsequent acquisition, $T_{current}$ is the accumulation time used in the current (most recent) acquisition event of operation 302, target signal density is the predetermined target signal density, and measured signal density is as determined in operation 304. When the signal density ratio is greater than 1.0, it is assumed that the measured signal density is too sparse and thus the accumulation time for the subsequent acquisition event should be increased accordingly. When the signal density ratio is less than 1.0, it is assumed that the measured signal density is too dense and thus the accumulation time for the subsequent acquisition event should be decreased accordingly. When the signal density ratio is equal to 1.0 (or within a threshold amount of 1.0, e.g., ±10%), it is assumed that the measured signal density is sufficiently close to the target signal density and thus the accumulation time for the subsequent acquisition event may remain the same.

To illustrate the peak-spacing approach, if the target signal density is 10% (1 set of adjacent peaks every 10 peak widths), the measured signal density is 20% (1 set of adjacent peaks every 5 peak widths), and the acquisition time $T_{current}$ for the acquisition event was 1 second, system 200 would determine that the accumulation time $T_{subs}$ for the subsequent acquisition event is to be decreased to one-half (½) second to decrease the signal density. On the other hand, if the target signal density is 10% (1 set of adjacent peaks), the measured signal density is 5% (1 set of adjacent peaks every 20 peak widths), and the acquisition time $T_{current}$ for the acquisition event was 1 second, system 200 would determine that the accumulation time $T_{subs}$ for the subsequent acquisition event is to be increased to 2 seconds to increase the signal density. If the target signal density is 10% (1 set of adjacent peaks), the measured signal density is 9% (1 set of adjacent peaks every 9 peak widths), and the acquisition time $T_{current}$ for the acquisition event was 1 second, system 200 would determine that the accumulation time $T_{subs}$ for the subsequent acquisition is 1 second and is not to change.

In alternative examples, the relationship between accumulation time and signal density is non-linear. Any non-linear function may be used to correlate accumulation time to the measured signal density and the target signal density. In some examples, non-linear functions may be used when the measured signal density is high or exceeds a threshold level. In some examples, system 200 may receive user input specifying a linear (e.g., Equation (1)) or non-linear correlation to be used.

System 200 may set the accumulation time for the subsequent acquisition event as the calculated accumulation time $T_{subs}$. Thus, the subsequent acquisition event is performed with the new accumulation time.

When operating with the low ion quantities of the individual-ion regime of CDMS, the signal density and/or intensity of signals may be unstable and vary nontrivially from one spectrum to the next, whether due to random chance or due to variations in ion flux from the ion source. The ion flux from the ion source may vary, for example, due to changing ionization conditions or due to a sample being analyzed on-line, via flow injection analysis, liquid chromatography, or capillary electrophoresis. Accordingly, in some examples, system 200 sets the accumulation time for the subsequent acquisition event by determining an amount of change in the accumulation time (e.g., the increase or decrease in accumulation time for the subsequent acquisition event relative to the acquisition event of operation 302) and adjusting the amount of change in accumulation time by applying a filter or imposing a change limit on the amount of change in the accumulation time. Any suitable filter may be applied, such as an exponential filter with filter coefficients configured to minimize the effects due to random chance. Additionally or alternatively, any suitable change limit may be applied, such as a maximum change amount (e.g., a maximum change amount of 10 milliseconds (ms)) or a predetermined percentage of the change amount (e.g., 50%, 33%, 20%, etc.). By applying a filter or change limit, the accumulation time may be changed in a fractional or step-wise manner, which serves to avoid or reduce the occurrence of wide spectrum-to-spectrum oscillations in the accumulation time and adds stability to the accumulation time.

In some examples, system 200 may be configured to receive user input setting one or more filter parameters (e.g., coefficients) and/or change limit parameters and may set the filter parameters and/or change limit parameters based on the user input. For example, a user may specify one or more parameters of the exponential filter, the maximum change amount, and/or the predetermined percentage of the change amount, as well as which filter or change limit to be applied.

Illustrative AIC methods according to the peak-spacing approach and the summed-intensity approach will now be described. The examples that follow are described with reference to adjusting accumulation time but may similarly be applied to adjusting the electric potential applied to ion optics to adjust the ion flux delivered to the mass analyzer.

Figure 4:
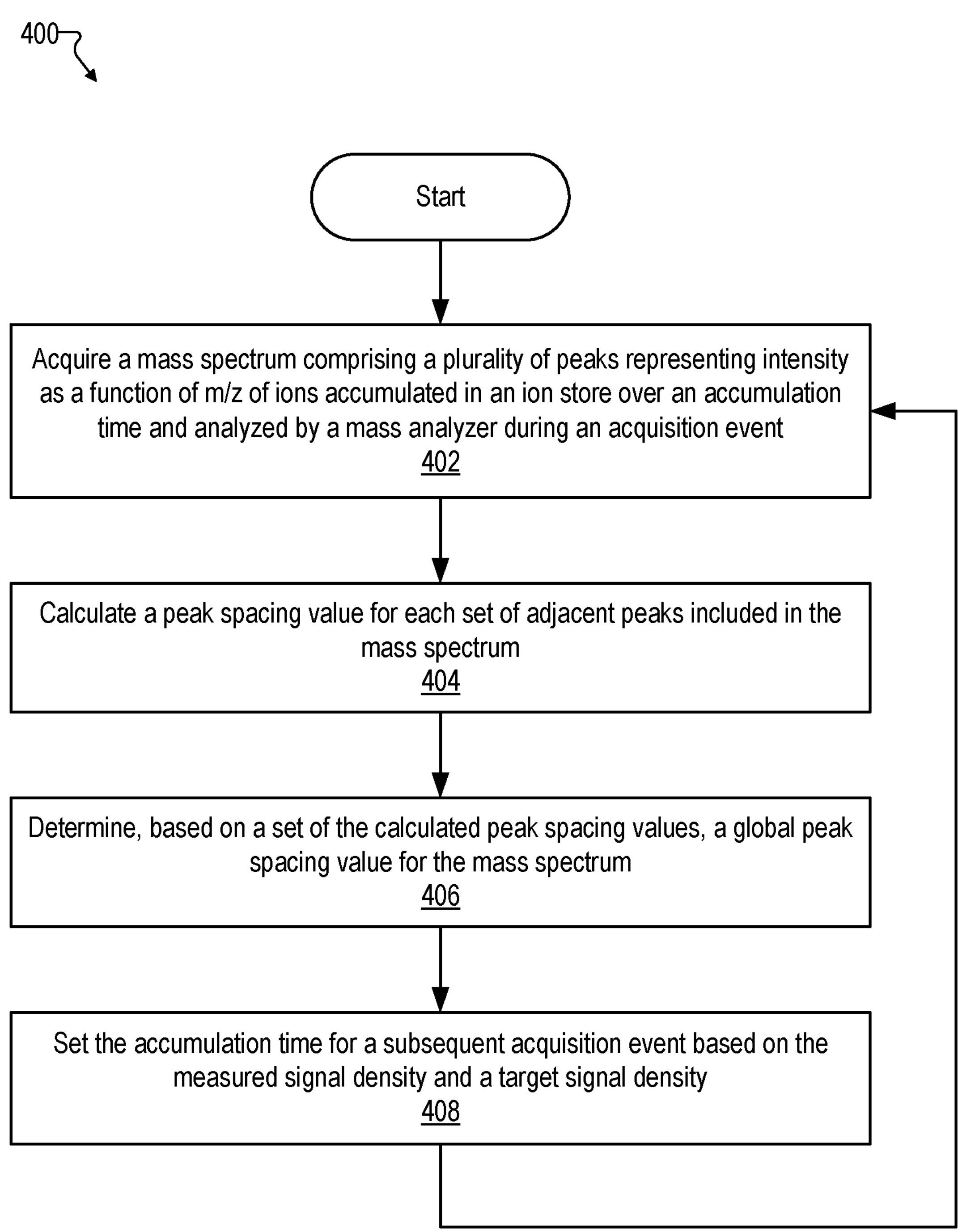
FIG. 4 shows an illustrative method of performing automatic ion control according to a peak-spacing approach.

FIG. 4 shows an illustrative method 400 of performing AIC according to the peak-spacing approach. While FIG. 4 shows illustrative operations according to one embodiment, other embodiments may omit, add to, reorder, and/or modify any of the operations shown in FIG. 4. One or more of the operations shown in FIG. 4 may be performed by system 200, any components included therein, and/or any implementations thereof (e.g., by mass spectrometer 100, one or more components of mass spectrometer 100, and/or a remote computing system separate from mass spectrometer 100).

At operation 402, system 200 acquires a mass spectrum comprising a plurality of peaks representing intensity as a function of m/z of ions accumulated in an ion store over an accumulation time and analyzed by a mass analyzer during an acquisition event. System 200 may perform operation 402 in any suitable way, including any way described above with respect to operation 302.

At operation 404, system 200 calculates a peak spacing value for each set of adjacent peaks included in a selected m/z range of the mass spectrum. As explained above, the selected m/z range may include the entirety of the detection window of the mass spectrum or any portion thereof. In some examples, the selected m/z range is specified by user input and may be a narrow m/z range of interest. The mass spectrum includes a plurality of peaks arranged along the m/z domain in order of increasing m/z. As used herein, a set of adjacent peaks means two peaks that are nearest to one another along the m/z domain of the mass spectrum. Thus, other than the peaks at the lowest and highest detected m/z, each peak will have two adjacent peaks. The peak spacing value for a set of adjacent peaks is the distance, along the m/z domain, between the adjacent peaks. System 200 calculates the spacing between each set of adjacent peaks.

The probability of coincidental ions is related to spectral resolution. Higher resolutions will reduce the probability that two adjacent signals interfere with one another. To account for this, the signal density is measured in units that reflect the actual peak capacity of a spectrum. Accordingly, signal density in the peak-spacing approach is measured in terms of peak widths instead of simply measuring the number of peaks across the m/z range.

The peak width may be determined in any suitable way. In some examples, the peak width is the anticipated instrument peak width. In other examples, the peak width is the peak width as measured from the mass spectrum. For instance, the peak width may be the average peak width of all peaks included in the mass spectrum or all peaks within the selected m/z range (e.g., an m/z range of interest selected by a user). The peak width measured from the spectrum advantageously accounts for ions that do not survive the entire detection period. These ions may produce a peak that is wider than would be expected for a given detection time, and having wider peaks will increase the probability of overlapping signals. Using the measured peak width also accounts for ions that have unstable m/z during the detection period. These unstable ions are most typically large biomolecular complexes, which have been incompletely desolvated, or those that fragment covalent bonds during the detection period. As the ion has collisions with background gas molecules, the ion heats up and effectively boils off attached solvent, reducing the mass and, therefore, the measured m/z. The drifting m/z produces a spectral peak that is wider than would be expected from an ion with a stable m/z.

At operation 406, system 200 determines, based on the peak spacing values calculated at operation 404, a global peak spacing value for the selected m/z range. The global peak spacing value is used as the measured signal density. The global peak spacing value may be an average, a weighted average (e.g., that weights smaller peak spacing values heavier), a median, or any other statistical representation of the calculated peak spacing values within the selected m/z range. In the examples described herein, the global peak spacing value is represented as a percentage (e.g., one (1) set of adjacent peaks every M peak widths where M is the global peak spacing value). However, the global peak spacing value may be represented in any other way (e.g., by M peak widths), provided that the equations described herein are adapted accordingly.

Mass spectra of real samples show that peaks generally are not randomly distributed across the m/z domain but rather tend to cluster together due to ion charge being quantized (e.g., z being only integer values, which constrains m/z variability) and due to the many sources of subtle mass variability possible within the analytes. Some sources of subtle mass variability include, for example, isotopic variability, post translational modifications, and adduction of cations and solvent. This clustering can leave large regions of the spectrum completely vacant, especially if ion signals do not extend to the upper and lower m/z limits of the acquisition range. Vacant m/z regions may artificially reduce the measured signal density even though there are local regions of high density with increased probability of interfering signals.

To address the uneven distribution and clustering of peaks, method 400 may consider only the densest regions of the spectrum or the selected m/z range. This may be achieved by calculating the global peak spacing value based on a subset of the peak spacing values calculated at operation 404. The subset of peak spacing values generally includes the smallest peak spacing values, which represent the densest regions of the spectrum or the selected m/z range. In some examples, the subset of the calculated peak spacing values includes a percentage (e.g., 50%, 40%, 30%, etc.) of the smallest peak spacing values. For example, system 200 may arrange the calculated peak spacing values in a list in ascending order and calculate the global peak spacing value based only on the top 50%, 40%, 30%, or other percentage of the calculated peak spacing values. In other examples, the subset of the calculated peak spacing values includes all peak spacing values less than a threshold peak spacing value. In some examples, the threshold peak spacing value is set based on the target signal density (e.g., 200% or 300% of the target signal density).

At operation 408, system 200 sets the accumulation time for the subsequent acquisition event based on the measured signal density (e.g., the global peak spacing value calculated at operation 406) and the predetermined target signal density (e.g., a target peak spacing value). System 200 may set the accumulation time in any suitable way, including in any manner described above with respect to operation 306.

Upon completion of operation 408, processing of method 400 returns to operation 402 and method 400 is performed again for the subsequent acquisition event. With method 400, the peak-spacing approach accounts for any changing ion flux by using each spectrum as a guide to determine the accumulation time for the subsequent acquisition event.

In the peak-spacing approach, the use of the signal density metric is beneficial in eliminating the influence of low charge contaminants that may appear in the spectrum. The presence of small numbers of ions allows CDMS to be performed with low concentration samples, which are more susceptible to contamination. Contaminants are typically low mass species that carry only one or two charges. To be detectable in CDMS (which is generally incapable of detecting and assigning charge to individual ions of low charge state), the signal from contaminants will arise from numerous ions at the same m/z. Since these are singular peaks, and a typical mass spectrum acquired by CDMS may contain hundreds of individual ions, these singular peaks do not contribute significantly to the signal density and, therefore, do not influence the optimized accumulation times.

Figure 5:
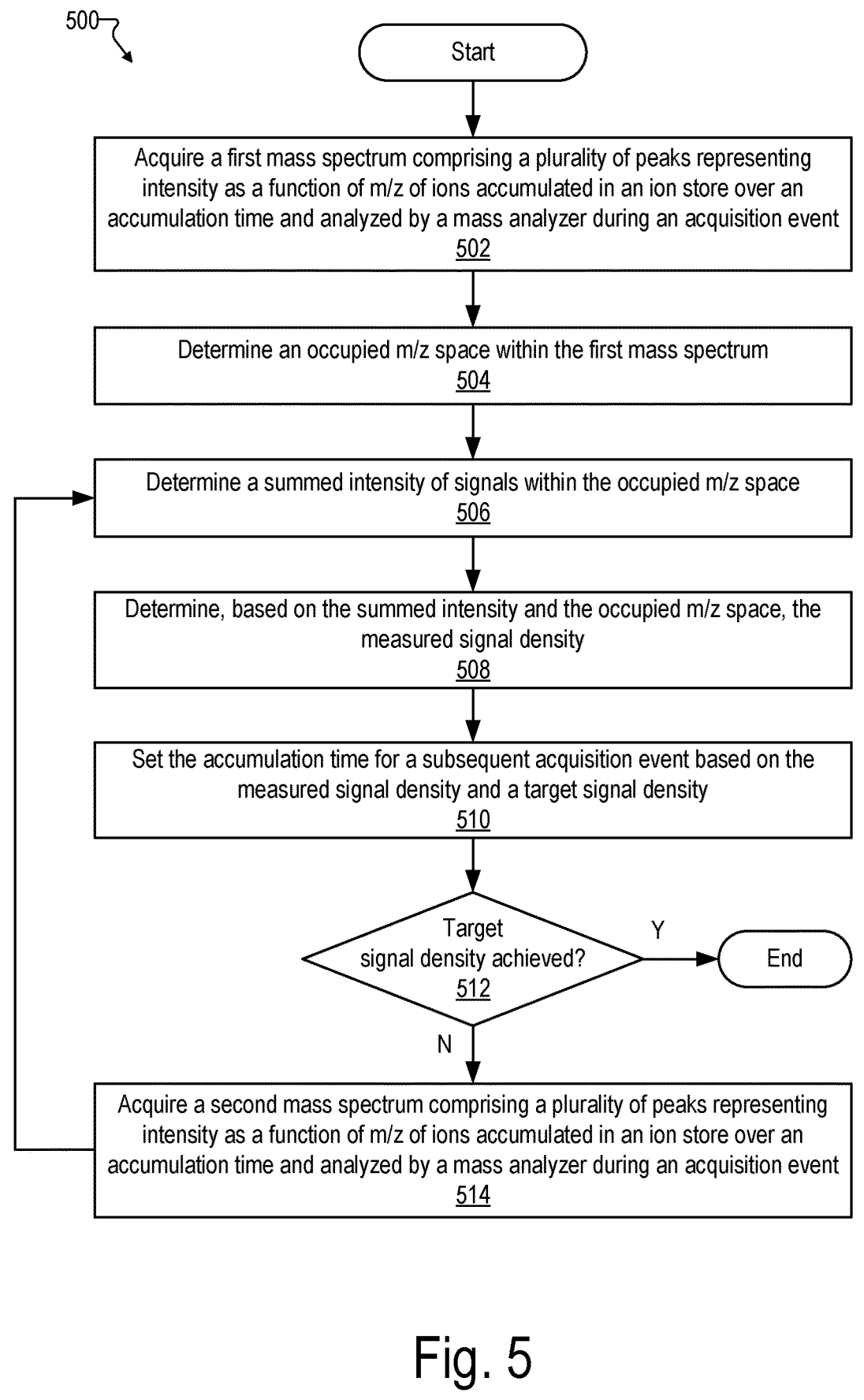

FIG. 5 shows an illustrative method 500 of performing AIC according to the summed-intensity approach. While FIG. 5 shows illustrative operations according to one embodiment, other embodiments may omit, add to, reorder, and/or modify any of the operations shown in FIG. 5. One or more of the operations shown in FIG. 5 may be performed by system 200, any components included therein, and/or any implementations thereof (e.g., by mass spectrometer 100, one or more components of mass spectrometer 100, and/or a remote computing system separate from mass spectrometer 100).

At operation 502, system 200 acquires a first mass spectrum comprising a plurality of peaks representing intensity as a function of m/z of ions accumulated in an ion store over an accumulation time and analyzed by a mass analyzer during an acquisition event. System 200 may perform operation 502 in any suitable way, including any way described above with respect to operation 302. In some examples, the first mass spectrum is acquired by setting a high accumulation time and acquiring a survey spectrum. System 200 will use the first mass spectrum to flag any regions in m/z space that should be excluded when determining the measured signal density (e.g., regions that are occupied by noise and/or low-mass contaminant signals).

In some examples, the first mass spectrum represents an ensemble of a population of ions. In an ensemble measurement, multiple acquisitions or spectra may be used to sample a large ion population (typically but not exclusively $10^5$ or more total charges). Multiple spectra may be summed or averaged for the ensemble measurement. In other examples, the first mass spectrum is acquired by individual ion measurements. For example, multiple acquisitions or spectra may be used to adequately sample populations of the most abundant analyte population, such as a proteoform.

At operation 504, system 200 determines an occupied m/z space within a selected m/z range of the mass spectrum acquired at operation 302. As explained above, the selected m/z range may include the entirety of the detection window of the mass spectrum or any portion thereof. In some examples, the selected m/z range is specified by user input and may be a narrow m/z range of interest. The occupied m/z space is the space, in the m/z domain of the mass spectrum, that is likely occupied by detectable ion signals of interest. System 200 may determine the occupied m/z space in any suitable way.

In some examples, system 200 excludes from the occupied m/z space any m/z region (e.g., m/z bin, as explained below) containing only signals less than a minimum threshold intensity value (e.g., 5% relative abundance, 3% relative abundance, etc.). Signal below the minimum threshold intensity value are considered noise, and thus any m/z region containing exclusively noise is excluded from the occupied m/z space since the inclusion of noise signals does not assist in determining whether the regions that are occupied have signal at a single-ion level.

In some examples, the occupied m/z space also excludes space occupied predominantly or solely by contaminants. Some samples may contain contaminants that hinder the determination of the occupied m/z space. Contaminants can include abundant low mass species from the sample that are not removed during sample preparation, or other substance that may be added during the preparation process. During ensemble measurements, contaminants can dominate the spectrum, pushing the target analyte below a desired relative abundance. As such, the occupied m/z space for a contaminated sample would be vastly smaller than what is otherwise expected. A vastly smaller occupied m/z space results in a larger measured signal density, which drives the AIC algorithm to reduce the accumulation time and thereby scale down the ion population beyond what is practical for a timely CDMS experiment.

In some situations, contaminant peaks present as a simplistic distribution, such as a series of tight isotopic distributions. A real-time charge deconvolution algorithm used for processing of the mass spectrum (e.g., Advanced Peak Determination (APD), THRASH, or MaxEnt) may assign charge to each peak included in the selected m/z range. Accordingly, contaminants may be identified based on their assigned charge state. The ions assigned a low charge state are considered contaminants. For example, system 200 may identify as presumptive contaminants all signals within the selected m/z range assigned a charge state less than or equal to a threshold charge state value (e.g., +2). The threshold charge state value may be chosen to coincide with the maximum charge state of prevalent contaminants. When determining the occupied m/z space and the measured signal density, system 200 may exclude all regions that contain contaminants.

Some contaminant peaks may not be identified or assigned a charge state using the charge deconvoluter. Accordingly, in some examples, system 200 also excludes from the occupied m/z space the regions that contain a small number of the most abundant peaks to catch the occasional contaminant peak that is not assigned a charge state. For example, system 200 may exclude the regions containing a threshold number (e.g., 15, 10, 8, 5, etc.) of the most abundant peaks. Alternatively, system 200 may exclude the regions containing all peaks exceeding a maximum threshold intensity level (e.g., relative abundance of 80%, 90%, 95%, etc.). Some non-contaminant peaks may be erroneously removed in this manner, but, assuming a constant false discovery rate, these errors may be consistently accounted for in the target signal density value.

Some contaminants, such as a polymer or a plasticizer introduced via sample processing or molecular variation within the sample itself, produce peaks that are not excluded by the methods described above (e.g., have an intensity value between the minimum threshold intensity value and the maximum threshold intensity value). Accordingly, in some examples, system 200 excludes from the occupied m/z space any region of the selected m/z range that has, or is likely to have, an identified or identifiable contaminant. For example, system 200 may identify contaminants based on a library search of peaks in the selected m/z range and/or a list of the m/z of expected contaminants.

System 200 may determine the occupied m/z space by subdividing the selected m/z range into N non-overlapping bins of bin width $\Delta_i$ and calculating the occupied m/z space based on the following Equation (2):

$$\text{occupied m/z space} = \sum_{i=1}^{N} w_i \Delta_i \tag{2}$$

where N is the number of bins, index i indicates a bin from 1 to N, bin width $\Delta_i$ is the width of each bin (in m/z), and $w_i$ is a bin weight assigned to each bin. The bin width $\Delta_i$ may be constant for each bin (e.g., 5 m/z, 10 m/z, etc.), vary as a function of m/z, vary as a function of density of detectable signals at a particular m/z, user-defined, or otherwise assigned. In some examples, bins are assigned a bin weight $w_i$ equal to or greater than zero (0) and less than or equal to one (1). Bin weights $w_i$ may be determined based on the signal intensity of the bin. The signal intensity of a bin may be, for example, the maximum, average, median, or total (sum) of all peak intensities within the bin.

For example, each bin with an intensity value less than the minimum threshold intensity value (e.g., noise) and/or associated with a contaminant signal may be assigned a bin weight $w_i$ of zero (0). In this way, system 200 excludes from the occupied m/z space regions containing noise and/or contaminants. In some examples, each bin not associated with noise or a contaminant signal is assigned a bin weight $w_i$ of one (1). In other examples, bins not associated with noise or a contaminant signal are not weighted equally but instead are weighted based on the signal intensity of each bin.

To illustrate, if the signal level of a bin is less than a first threshold intensity value (e.g., the minimum (noise) threshold intensity value), system 200 may assign the bin a bin weight $w_i$ of zero (0). If the signal level of a bin is greater than or equal to the first threshold intensity value but less than a second threshold intensity value (e.g., a relative abundance of 15%, 20%, 25%, etc.), system 200 may assign the bin a bin weight $w_i$ greater than 0 but less than 1. If the signal level of the bin is greater than or equal to the second threshold intensity value but less than a third threshold intensity value (e.g., the maximum intensity value for cutoff of contaminants), system 200 may assign the bin a bin weight $w_i$ of one (1). If the signal level of the bin is greater than the third threshold intensity value, system 200 may assign the bin a bin weight $w_i$ of zero (0). For the bins between the first threshold intensity value and the second threshold intensity value, the bin weight $w_i$ assigned to the bins may be the same, may vary linearly as a function of the intensity of each bin between the first threshold intensity level and the second threshold intensity level, or may vary non-linearly (e.g., exponentially, step-wise, etc.) based on the signal intensity of each bin.

In some examples, any one or more of the first threshold intensity level, second threshold intensity level, and third threshold intensity level varies linearly with m/z (e.g., decreases linearly with increasing m/z). This is because the intensity of individually-resolved ions increases with decreasing m/z (increasing charge z).

By scaling the occupied m/z space as described herein using bin weights $w_i$, the contribution to the occupied m/z space of bins with low signal intensity may be weighted less than the contribution to the occupied m/z space of bins with higher signal intensity. This is because bins with higher signal intensity are more likely to contribute to signal interference than bins with lower signal intensity.

At operation 506, system 200 determines a summed intensity of signals within the occupied m/z space. System 200 steps through the first mass spectrum and queries the signal intensity of each bin, excluding the signal intensity of any bin of the selected m/z range excluded from the occupied m/z space. For example, system 200 may determine the summed intensity by summing the signal intensities of bins within the occupied m/z space according to the following equation (3):

$$\text{summed intensity} = \sum_{i=1}^{N} W_i r_i \tag{3}$$

where N is the number of bins (as in Equation (2)), index i indicates a bin from 1 to N, $W_i$ is a signal weight assigned to each bin, and $r_i$ is the signal intensity of each bin. System 200 may determine signal weight $W_i$ for each bin in any way described above for bin weight $w_i$. For example, each bin with a signal intensity less than the minimum threshold intensity value and/or associated with a contaminant signal may be assigned a signal weight $W_i$ of zero (0), and each bin not associated with noise or a contaminant may be assigned a signal weight $W_i$ of one (1). In other examples, bins not associated with noise or a contaminant are not weighted equally but instead are weighted based on the signal intensity $r_i$ of each bin, as explained above for bin weights $w_i$. In some examples, signal weight $W_i$ and bin weight $w_i$ for each bin are the same (e.g., $W_i = w_i$). In other examples, signal weight $W_i$ and bin weight $w_i$ for a bin may be different. By scaling the signal intensity of bins as described herein, the contribution of bins with low signal intensity to the summed intensity may be weighted less than the contribution of bins with higher signal intensity. Again, this is because bins with higher signal intensity are more likely to contribute to signal interference than bins with lower signal intensity.

At operation 508, system 200 determines the measured signal density based on the summed intensity within the occupied m/z space and the occupied m/z space. For example, system 200 may determine the measured signal density in accordance with the following Equation (4):

$$\text{measured signal density} = \frac{\text{summed intensity}}{\text{occupied m/z space}} \tag{4}$$

where the occupied m/z space is as determined in operation 504 and the summed intensity is as determined in operation 506.

At operation 510, system 200 sets the accumulation time for the subsequent acquisition event based on the measured signal density (intensity per unit m/z), as determined in operation 508, and the predetermined target signal density. System 200 may set the accumulation time in any suitable way, including in any manner described above with respect to operation 306.

At operation 512, system 200 determines if the target signal density has been achieved. In some examples, system 200 determines that the target signal density has been achieved when the measured signal density is within a threshold amount (e.g., 5%, 10%, 15%, etc.) of the measured signal density. If system 200 determines that the target signal density has been achieved, processing of method 500 ends and AIC is considered completed. An experimental analysis may then be performed with the accumulation time set in operation 510. If system 200 determines that the target signal density has not been achieved, processing of method 500 proceeds to operation 514.

At operation 514, system 200 acquires a second mass spectrum. Operation 512 may be performed in any suitable way, including in any way described herein for operation 502. For example, the second mass spectrum may be another survey spectrum. However, the second mass spectrum is acquired with the accumulation time set in operation 510. Upon completion of operation 514, processing of method 500 returns to operation 506 to determine the measured signal density of the second mass spectrum. Processing of method 500 may continue and repeat until system 200 determines that the target signal density has been achieved.

Method 500 may be performed at any suitable time prior to and/or during an experimental analysis. For example, method 500 may be performed prior to initiating a CDMS experiment. Additionally or alternatively, method 500 may be performed during the experimental analysis to re-calibrate the accumulation time. In some examples, re-calibration is initiated by a user. In alternative examples, system 200 periodically acquires one or more survey spectra to compare the measured signal density with the target signal density and determine if a re-calibration is warranted. For example, system 200 may periodically perform operations 502, 504, 506, 508, and 512 (omitting operation 510 for the time being) to assess whether method 500 should be performed to re-calibrate the accumulation time.

As explained above, method 300, 400, or 500 may be performed during a CDMS experiment to characterize a sample and obtain mass domain spectra of analytes in the sample. Analytes may include, but are not limited to, one or more proteoforms or biomolecular complexes thereof, such as an immunoglobulins or their heavy chains, light chains, or Fd domains. As used herein, "proteoform" refers to all of the different molecular forms in which the protein product of a single gene can be found, including changes due to genetic variations, alternatively spliced RNA transcripts and post-translational modifications, and the like. In some examples, the proteoform in a sample is an immunoglobulin, such as an IgG. IgA, IgE, or IgM. CDMS allows for measuring complex proteoform mixtures and their complexes without separating the proteoforms prior to identification.

The CDMS technique using AIC, as described herein, may be successfully integrated into a full solution for processing plasma and automated CDMS analysis. Automated CDMS analysis has unlocked studies for protein analysis in cohorts of hundreds of patients without dependency on mixture complexity. Spectral outputs in the mass domain do not require any further deconvolution software, and this platform may enable analysis and characterization of denatured protein mixtures ranging from 6-100 kDa. High throughput automation of CDMS analysis also enables fast and robust acquisition of high-resolution mass domain spectra for intact proteins.

Figure 6:
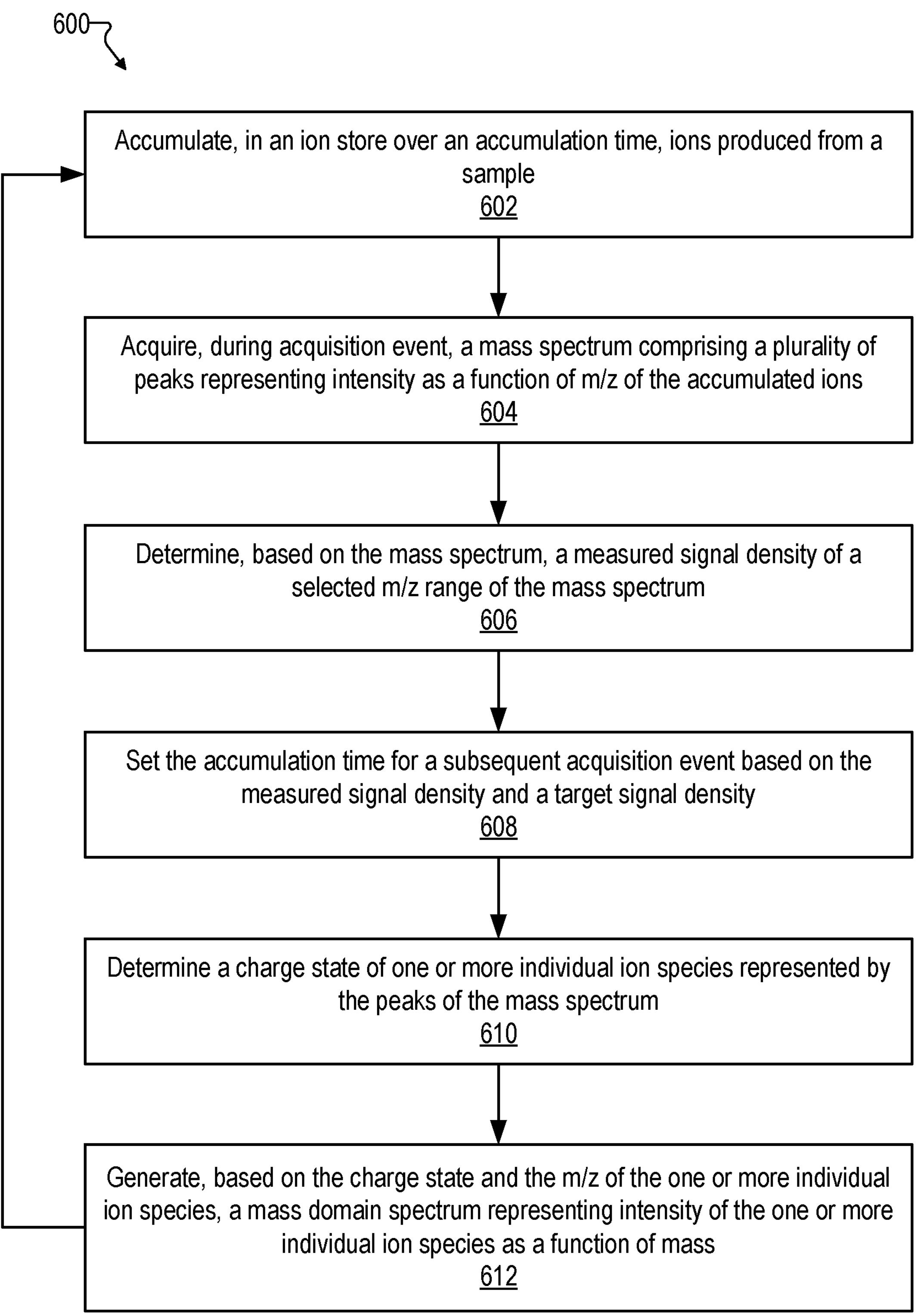
FIG. 6 shows an illustrative method of performing CDMS with automatic ion control.

FIG. 6 shows an illustrative method 600 of performing CDMS using AIC. While FIG. 6 shows illustrative operations according to one embodiment, other embodiments may omit, add to, reorder, and/or modify any of the operations shown in FIG. 6. One or more of the operations shown in FIG. 6 may be performed by system 200 and/or mass spectrometer 100, any components included therein, and/or any implementations thereof (e.g., by mass spectrometer 100, one or more components of mass spectrometer 100, and/or a remote computing system separate from mass spectrometer 100). The operations of method 600 may be performed in any suitable way, including any way described herein.

At operation 602, ions produced from a sample are accumulated in an ion store (e.g., ion store 104) over an accumulation time. In some examples, the sample is a proteoform.

At operation 604, a high resolution mass analyzer (e.g., an orbital electrostatic trap mass analyzer) acquires, during an acquisition event, a mass spectrum representing intensity as a function of m/z of the accumulated ions. In some examples, the mass analyzer is operated in a CDMS mode to acquire a mass spectrum of a population of ions in the individual ion regime.

At operation 606, a measured signal density of a selected m/z range of the mass spectrum is determined based on the mass spectrum. In some examples, the measured signal density is determined in accordance with the peak-spacing approach. In other examples, the measured signal density is determined in accordance with the summed-intensity approach.

At operation 608, the accumulation time for a subsequent acquisition event is set based on the measured signal density and a target signal density.

At operation 610, a charge state of an individual ion species represented by a peak within the selected m/z range of the mass spectrum is determined. For example, the charge state may be determined by a charge deconvolution algorithm. Alternatively, the charge state may be determined in accordance with the CDMS technique (e.g., by generating a STORI plot and determining the charge state based on a slope-to-charge calibration function).

At operation 612, a mass domain spectrum representing intensity of the individual ion species as a function of mass is generated based on the charge state of the individual ion species and the m/z of the individual ion species.

Processing of method 600 then returns to operation 602 and the process is repeated for the subsequent acquisition event. At operation 602, the ions are accumulated in the ion store over the accumulation time that was set in operation 608 during the previous cycle of method 600.

In the AIC methods described above, ions across the entire selected m/z range are accumulated in the ion store in a single accumulation event. As a result, the number of ions accumulated in the ion store will be constrained by the densest m/z region of the incoming ion beam (e.g., the ion beam from the ion source). If there is one particular region of m/z space in which the incoming ion beam is particularly dense, a single accumulation event will stop once enough ions from that m/z region have been accumulated. Otherwise, further accumulation of ions from the ion beam will risk accumulating in the ion store ions of the same or very similar m/z values in the densest region. When the single accumulation event stops, very few ions in other, less dense m/z regions will have been accumulated due to the lower probability of ions being contained in these m/z regions. Accordingly, ions located within the lower density m/z regions of the incoming ion beam may not be adequately sampled. To sample the ions located within the lower density m/z regions, additional mass analyses will need to be performed until enough signal from the lower density m/z regions has been acquired. Thus, acquiring sufficient signal for the lower density m/z regions consumes additional system resources and prolongs the CDMS process.

Figure 7A:
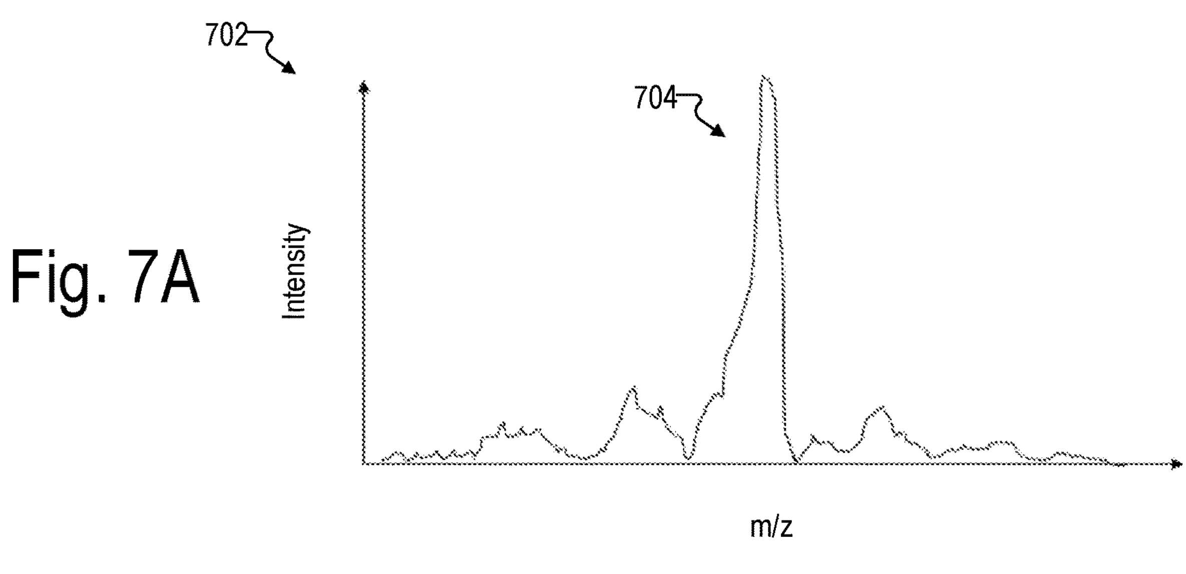
FIG. 7A shows an illustrative m/z distribution graph that plots intensity of ions in a hypothetical incoming ion beam as a function of m/z of the ions.
Figure 7B:
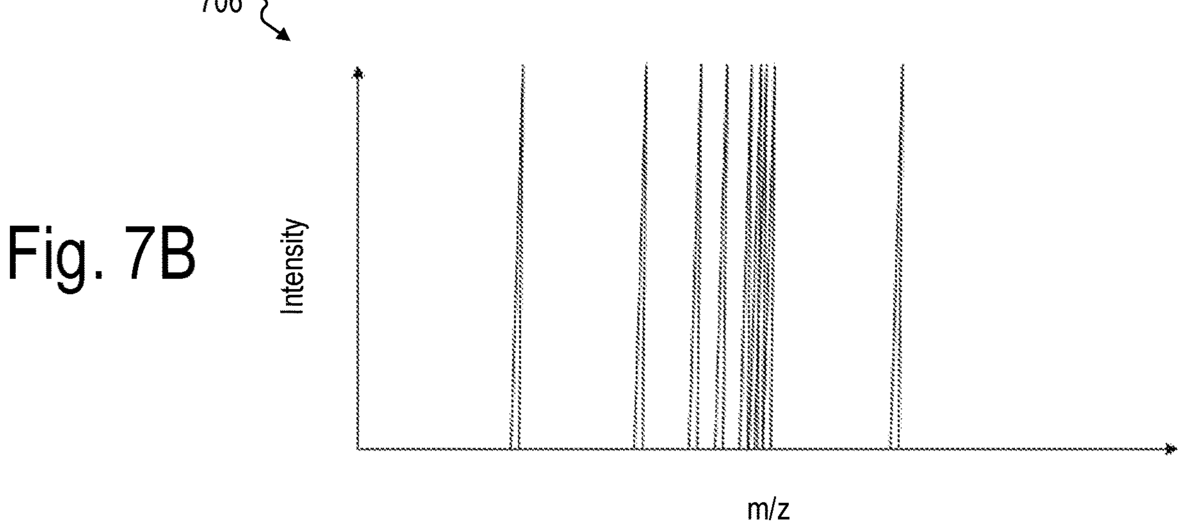
FIG. 7B shows an illustrative CDMS spectrum acquired by a mass analysis of a population ions accumulated in a single accumulation event.
Figure 7C:
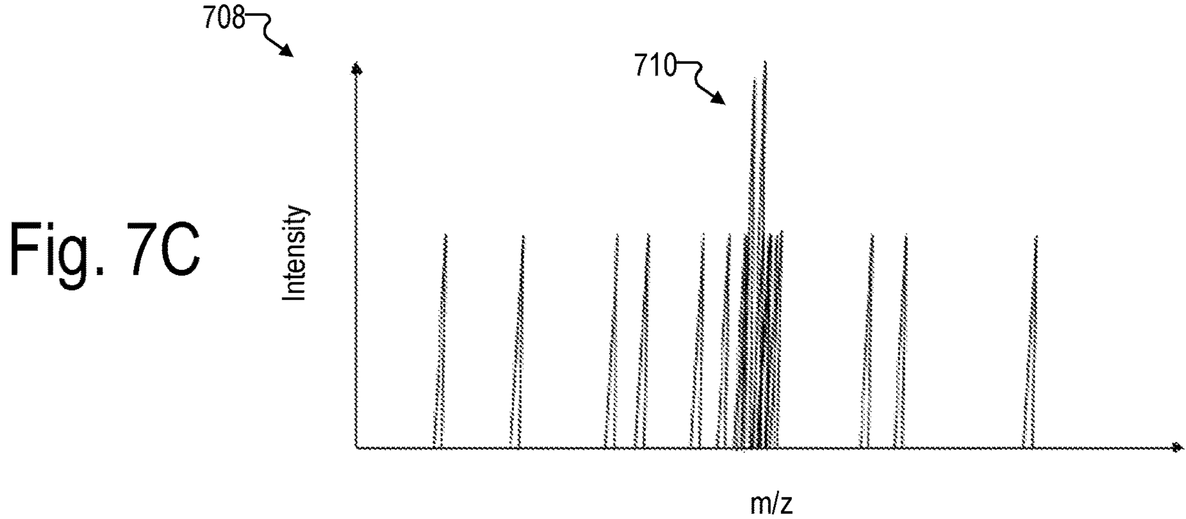
FIG. 7C shows an illustrative CDMS spectrum acquired by a mass analysis of a population of ions accumulated ions in a single accumulation event with an accumulation time twice the accumulation time of the example of FIG. 7B.

These problems are illustrated by FIGS. 7A to 7C. FIG. 7A shows an illustrative m/z distribution graph 702 that plots intensity of ions in a hypothetical incoming ion beam as a function of m/z of the ions. The m/z distribution graph 702 represents an m/z distribution of the incoming ion beam. If the ions across the entire m/z range are accumulated in an ion store in a single accumulation event, the AIC methods described herein may stop the accumulation of ions once a sufficient or maximum number of ions from the densest region (e.g., near the most intense peak 704) have been collected. A mass analysis of the accumulated ions may then be performed.

FIG. 7B shows an illustrative CDMS spectrum 706 acquired by the mass analysis of the ions accumulated in a single accumulation event. It is assumed that CDMS spectrum 706 does not cause issues with subsequent spectral processing because there are no double ion events (e.g., no ions having the same m/z were accumulated and combine to give a taller peak) and there are no interfering peaks that distort estimations. While several peaks are located at the densest m/z region (the m/z region corresponding to peak 704), very few peaks are located outside of the densest m/z region.

Now, assume that the accumulation time is twice the accumulation time of the analysis of FIG. 7B. FIG. 7C shows an illustrative CDMS spectrum 708 acquired by a mass analysis of the accumulated ions in a single accumulation event with twice the accumulation time of the example of FIG. 7B. As shown in CDMS spectrum 708, the lower density m/z regions of the incoming ion beam (the m/z regions away from peak 704 in m/z distribution graph 702) produce more peaks as compared with CDMS spectrum 706 due to the increased accumulation time and thus greater probability of ions in the less dense m/z regions being collected. However, in CDMS spectrum 708, the densest m/z region includes taller peaks 710, indicating double ion events that will result in incorrect charge assignments. Additionally, the proximity of adjacent peaks in the densest m/z region may cause errors in charge estimation due to interferences. Thus, as can be seen by FIGS. 7A to 7C, the densest m/z region of the incoming ion beam bottlenecks the maximum accumulation time that can be used with a single accumulation event approach for CDMS. This single accumulation event approach will inherently provide fewer detectable signals per unit time for the less dense m/z regions. To fully characterize the less dense m/z regions, many analyses would have to be performed since only occasional spectra would happen to contain ions in those less dense m/s regions.

To address these issues of the single accumulation event approach, a population of ions is accumulated in the ion store prior to the mass analysis in multiple distinct accumulation events to achieve a more uniform signal density across the m/z space. Each accumulation event corresponds to a distinct m/z region of the m/z space, and a separate ion population control parameter is determined for each m/z region to accumulate a desired number of ions during each accumulation event. As a result, the probability of detecting ions in the less dense m/z regions of the incoming ion beam is increased while the probability of multiple ion events and interferences in the higher density m/z regions is reduced. Thus, the accumulation of ions in the ion store is not bottlenecked by the densest m/z regions and many more ions in the less dense m/z regions may be sampled in each CDMS acquisition.

Figure 8:
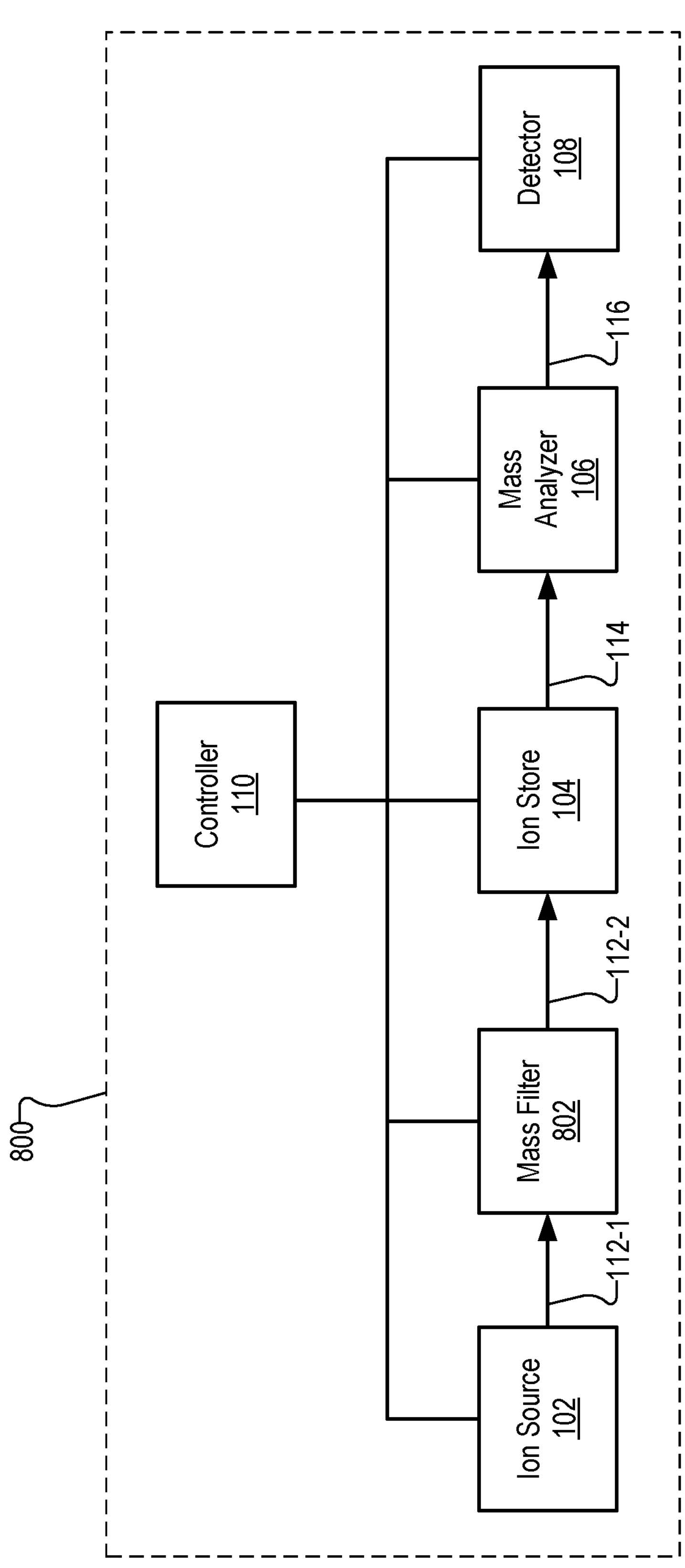
FIG. 8 shows a functional diagram of an illustrative mass spectrometer that may be used for CDMS with a multiple accumulation event approach.

The multiple accumulation event approach takes advantage of a mass filter that is positioned upstream of the ion store to selectively transmit for accumulation, during each accumulation event, ions within the corresponding m/z region. FIG. 8 shows a functional diagram of an illustrative mass spectrometer 800 that may be used for the multiple accumulation event approach. Mass spectrometer 800 is similar to mass spectrometer 100 except that mass spectrometer 800 includes a mass filter 802 positioned upstream from ion store 104. Mass filter 802 may be implemented by any suitable mass filter, such as a linear multipole mass filter (e.g., a quadrupole mass filter). An incoming ion stream 112-1 from ion source 102 is filtered by mass filter 802 to selectively transmit ions within a selected m/z range to ion store 104, which accumulates transmitted ions 112-2 during an accumulation event based on an ion population control parameter for the accumulation event. As shown in FIG. 8, detector 108 is positioned downstream of mass analyzer 106. However, in examples in which mass analyzer 106 is implemented by an orbital electrostatic ion trap mass analyzer, mass analyzer 106 and detector 108 are integrated in the same device.

Figure 9:
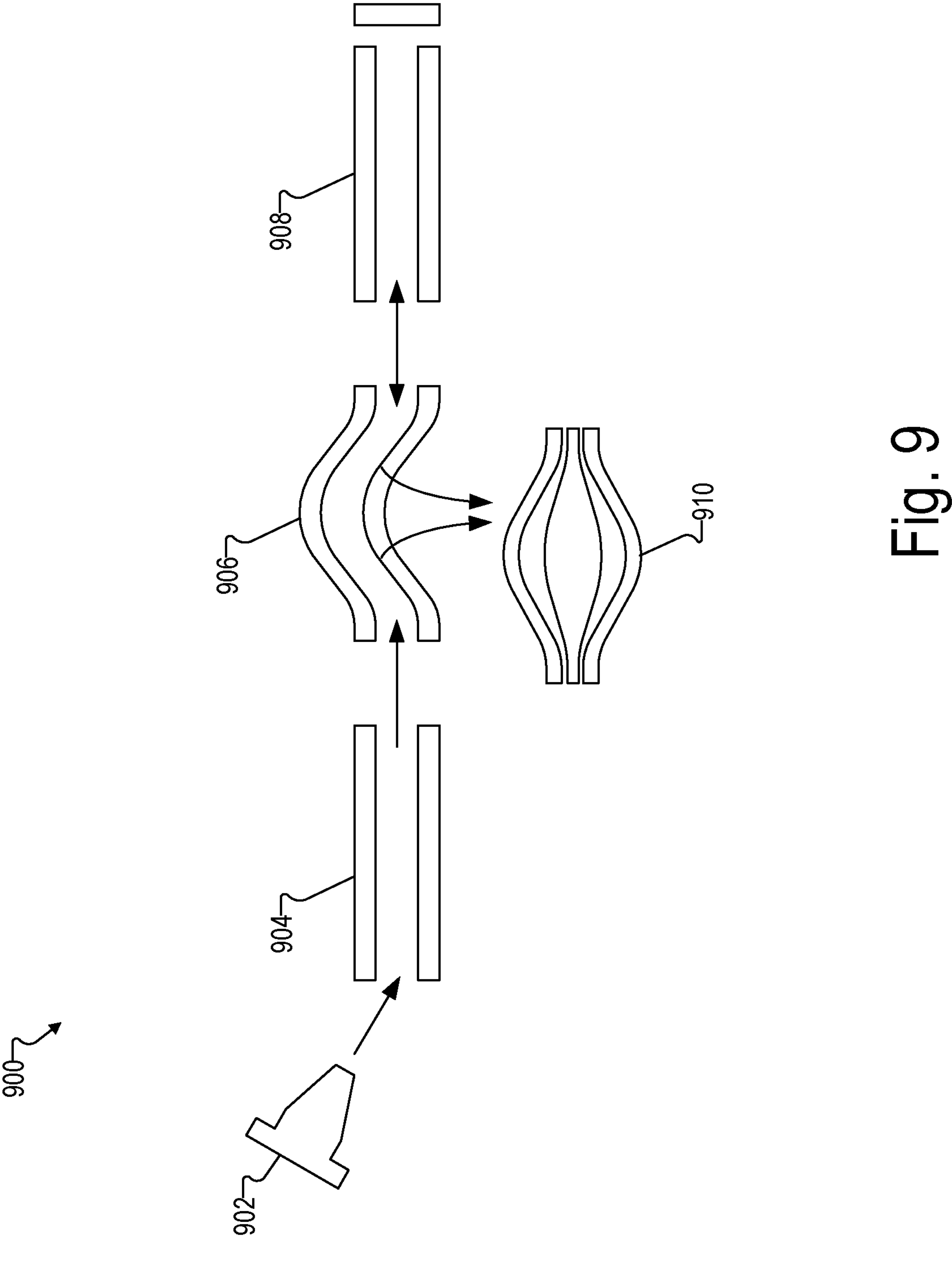
FIG. 9 shows a functional diagram of an illustrative mass spectrometer including an electrostatic trap mass analyzer.

FIG. 9 shows a functional diagram of an illustrative mass spectrometer 900 including an electrostatic trap mass analyzer. Mass spectrometer 900 may implement mass spectrometer 800 and may be used to perform CDMS using a multiple accumulation event approach. As shown, mass spectrometer 900 includes an ion source 902, a mass filter 904, an ion trap 906, a collision cell 908, and an electrostatic trap mass analyzer 910. Mass spectrometer 900 may further include additional or alternative components as may suit a particular implementation (e.g., ion optics, lenses, mass filters, ion storage devices, ion mobility analyzers, collision cells, ion flux monitor, etc.).

Ion source 902 may implement ion source 102 (e.g., an electrospray ionization source) and mass filter 904 may implement mass filter 802. Ion trap 906 traps ions prior to introducing the ions into mass analyzer 910. Ion trap 906 is downstream of mass filter 904 and upstream of mass analyzer 910. Ion trap 906 may be, for example, a multipole ion trap, such as a multipole linear ion trap, including a curved linear ion trap (C-trap).

Collision cell 908 may be any suitable collision cell, such as a high pressure collision dissociation (HCD) cell. Collision cell 908 is positioned downstream of mass filter 904 and ion trap 906 and upstream of mass analyzer 910. In non-CDMS applications, such as MS/MS, collision cell 908 is configured to fragment ions received from ion trap 906. In CDMS applications, collision cell 908 may function as an ion trap to accumulate ions that have passed through ion trap 906. Collision cell 908 ejects trapped ions back to ion trap 906 prior to introduction of the ions into mass analyzer 910. Ion trap 906 and/or collision cell 908 may implement ion store 104 of mass spectrometer 800.

Mass analyzer 910 is an electrostatic ion trap mass analyzer, such as an orbital electrostatic ion trap mass analyzer (e.g., an Orbitrap™ mass analyzer, a Kingdon trap mass analyzer, etc.) or an electrostatic linear ion trap (ELIT).

Figure 10:
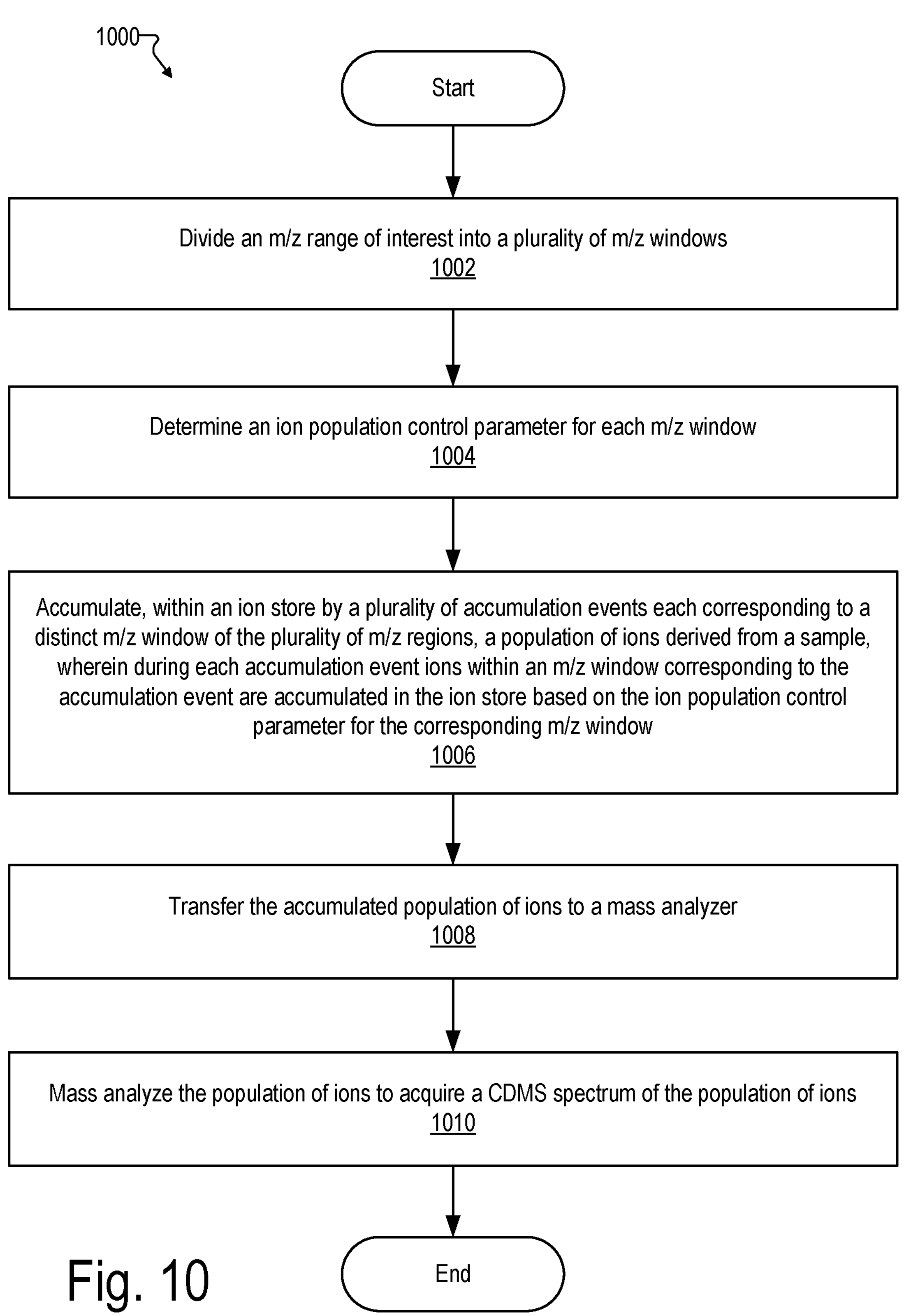
FIG. 10 shows a flowchart of an illustrative method of performing CDMS using a multiple accumulation event approach.

Illustrative examples of performing CDMS with a multiple accumulation event approach will now be described with reference to FIG. 10. FIG. 10 shows a flowchart of an illustrative method 1000 of performing CDMS using a multiple accumulation event approach. While FIG. 10 shows illustrative operations according to one embodiment, other embodiments may omit, add to, reorder, and/or modify any of the operations shown in FIG. 10. One or more of the operations shown in FIG. 10 may be performed by system 200, any components included therein, and/or any implementations thereof (e.g., by mass spectrometer 800 or 900, one or more components of mass spectrometer 800 or 900, and/or a remote computing system separate from mass spectrometer 800 or 900).

At a first operation 1002, an m/z range of interest is subdivided into a plurality of m/z windows. The m/z range of interest is the m/z range to be mass analyzed by CDMS and will be the m/z range of the resulting CDMS spectrum. Various methods for subdividing the m/z range of interest into a plurality of m/z windows will be described below in more detail.

At operation 1004, an ion population control parameter is determined for each m/z window. The ion population control parameter for each m/z window regulates a quantity of ions accumulated in an ion store (e.g., ion store 104, ion trap 906, or collision cell 908) during an accumulation event. As mentioned above, in some examples the ion population control parameter is the accumulation time over which ions are accumulated in the ion store during an accumulation event. In other examples, the ion population control parameter is the electric potential applied to ion optics (e.g., lenses) that regulate an ion flux (e.g., ion stream 112-2) that is delivered to the ion store during an accumulation event. The ion population control parameter for each m/z window may be determined in any suitable way, including by any method described herein, such as method 300, 400, or 500. For example, the ion population control parameter may be determined independently for each m/z window using the m/z window as the selected m/z range described above with reference to methods 300, 400, and 500. Various methods for determining the ion population control parameter will be described below in more detail.

At operation 1006, a population of ions derived from a sample is accumulated in the ion store by one or more accumulation events. Each accumulation event corresponds to a distinct m/z window of the plurality of m/z windows. During each accumulation event, ions within the m/z window (e.g., ions having an m/z within an m/z range of the m/z window) corresponding to the accumulation event are accumulated in the ion store based on the ion population control parameter for the corresponding m/z window. For example, a mass filter (e.g., mass filter 802 or mass filter 904) selectively transmits only the ions within the m/z window of the current accumulation event. The accumulation time or electric potential applied to ion optics is set for the current accumulation event based on the ion population control parameter determined at operation 1004 for the corresponding m/z window so that a desired quantity of ions are accumulated in the ion store. In some examples, the population of ions is accumulated in the ion store while a prior population of ions is processed in the mass analyzer (e.g., mass analyzed at operation 1010, described below). In this way, the accumulation of the population of ions does not limit or constrain throughput of the experiment. In some examples, the one or more accumulation events by which the population of ions is accumulated in the ion store comprises the accumulation events for all m/z windows of the plurality of m/z windows (e.g., the accumulation events for all m/z windows spanning the entire m/z range of interest). In other examples, the one or more accumulation events by which the population of ions is accumulated in the ion store corresponds to a subset of one or more of the plurality of m/z windows. In further examples, the population of ions is accumulated in the ion store by one accumulation event corresponding to one m/z window.

At operation 1008, the accumulated population of ions (e.g., the population of ions accumulated by the plurality of successive accumulation events or during one or more of the one or more accumulation events) is transferred to a mass analyzer (e.g., mass analyzer 106 or mass analyzer 910) for mass analysis to acquire a CDMS spectrum.

At operation 1010, the population of ions is mass analyzed to acquire a CDMS spectrum of the population of ions. In examples where the one or more accumulation events corresponds to all m/z windows of the plurality of m/z windows, the m/z range of the CDMS spectrum is the m/z range of interest spanned by the plurality of m/z windows.

In examples where the one or more accumulation events corresponds to a subset of one or more of the plurality of m/z windows, operations 1006 to 1010 may be repeated until each m/z window of the plurality of m/z windows has been sampled. For example, the entire m/z range of interest may be subdivided into ten m/z windows. A first population of ions may be accumulated in the ion store by a first subset (e.g., five) of accumulation events corresponding to a first subset (e.g., five) of the ten m/z windows, transferred to the mass analyzer, and mass analyzed. A second population of ions may be accumulated in the ion store by a second subset (e.g., five) of accumulation events corresponding to a second subset of m/z windows, transferred to the mass analyzer, and mass analyzed. The acquired CDMS spectra for the first population of ions and the second population of ions may be combined to generate a CDMS spectrum spanning the m/z range of interest. In some examples, ions within one or more m/z windows (e.g., one or more sparse m/z regions) may be accumulated in both populations of ions.

Figure 11:
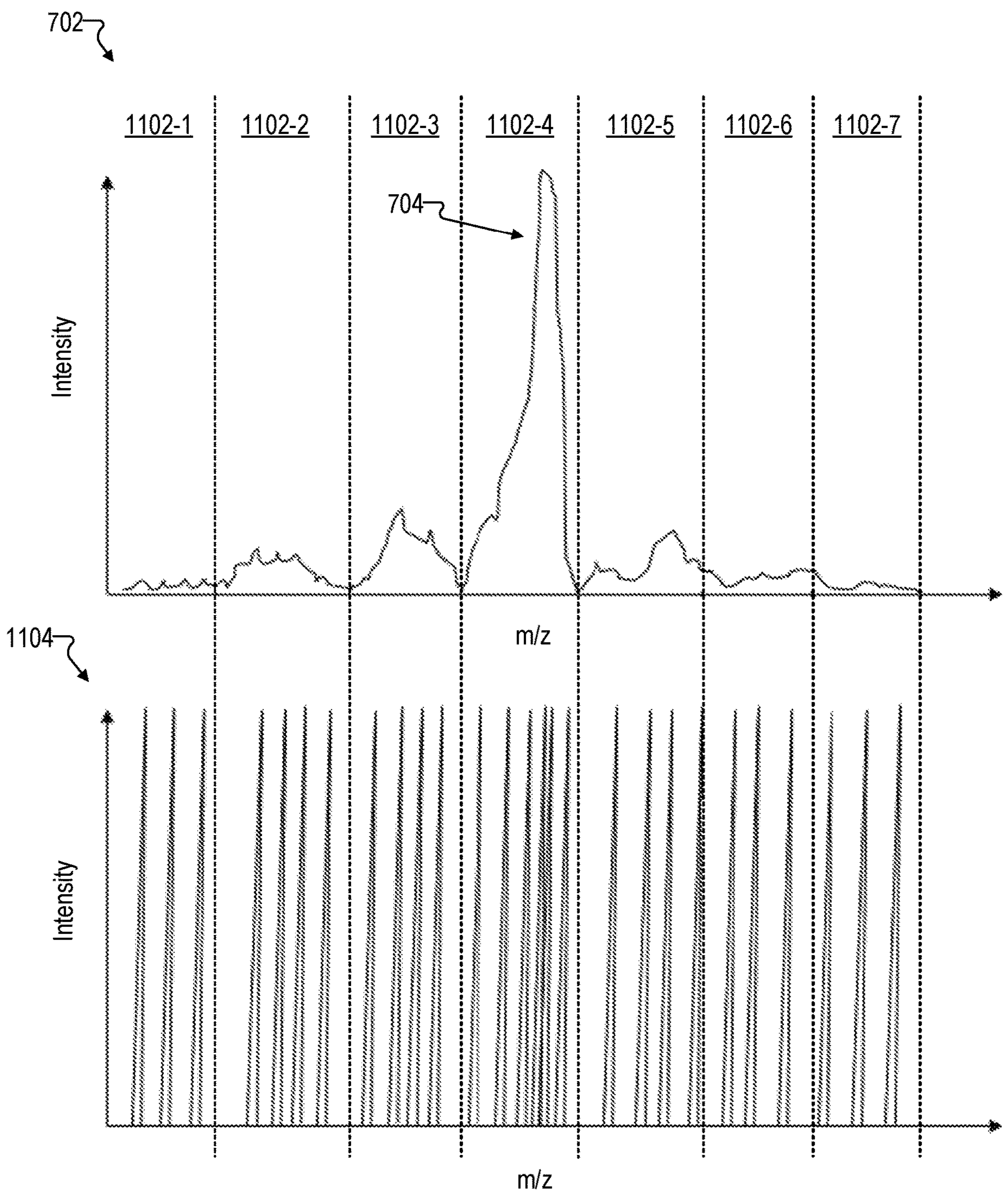
FIG. 11 shows the m/z distribution graph of FIG. 7A subdivided into a plurality of m/z windows for multiple accumulation events and an illustrative CDMS spectrum acquired by CDMS using multiple accumulation events.

Operation of method 1000 will now be described with reference to FIG. 11. FIG. 11 shows m/z distribution graph 702 subdivided into a plurality of m/z windows 1102 for multiple accumulation events and an illustrative CDMS spectrum 1104 acquired using multiple accumulation events. As shown in m/z distribution graph 702, the m/z range of interest is subdivided into distinct m/z windows 1102 (e.g., m/z windows 1102-1 to 1102-7) that together span the entire m/z range of interest. As used herein, m/z windows are "distinct" if they do not have the same combination of upper and lower m/z limits. As shown in m/z distribution graph 702, m/z windows 1102 are non-overlapping. However, in other examples any two or more distinct m/z windows 1102 may overlap. For example, a first m/z window 1102 may span the entire m/z range of interest while smaller m/z windows 1102 span less than the entire m/z range of interest (e.g., only sparse m/z regions), and any one or more of the smaller m/z windows 1102 may overlap with one or more other smaller m/z windows 1102. While m/z distribution graph 702 shows seven m/z windows 1102, the m/z range of interest may be subdivided into any other suitable number of m/z windows 1102. In some cases, the distinct m/z windows have gaps (i.e., do not continuously span the entire m/z range of interest). This can occur, for example, if ions in certain ranges of m/z are not of interest for the particular sample being measured.

The m/z range of interest may be subdivided into the plurality of m/z windows 1102 in any suitable way. In some examples, the m/z range of interest is subdivided into the plurality of m/z windows 1102 based on a fixed m/z width that is preset (e.g., that is set irrespective of an m/z distribution of the incoming ion beam (e.g., ion stream 112-1)). In some examples, m/z windows 1102 all have substantially the same m/z width (e.g., a width within 5% of one another). In further examples, the m/z range of interest is subdivided into a plurality of m/z windows 1102 based on the number of m/z windows into which the m/z range of interest will be subdivided, which may be preset or provided by user input. For example, given an m/z range of interest of 4,000-40,000 m/z to be subdivided into ten m/z windows, each m/z window would have a width of 3,600 m/z.

In some examples, the m/z range of interest is subdivided into the plurality of m/z windows 1102 based on an m/z distribution of ions in the incoming ion beam. In some examples, the m/z distribution of ions in the incoming ion beam is known (e.g., based on a known m/z distribution of a sample) and/or may be determined based on a characterization analysis or pre-scan of the sample performed prior to the CDMS analysis. In other examples, the m/z distribution of the incoming ion beam may be measured dynamically during the CDMS analysis. For example, a characterization analysis of the sample (e.g., ion stream 112-1) may be performed periodically or randomly during a CDMS analysis or when a calibration condition is satisfied (e.g., a multiple ion event is detected in an acquired CDMS spectrum, a peak width in a CDMS spectrum exceeds a threshold value, etc.). Additionally or alternatively, the measured m/z distribution of the incoming ion beam may be determined based on one or more CDMS spectra acquired previously. For instance, one or more CDMS spectra acquired by performing method 1000 prior to performing method 1000 for a current CDMS spectrum acquisition may be used as the m/z distribution of the currently incoming ion beam.

In some examples, the m/z range of interest is subdivided into the plurality of m/z windows 1102 based on at least one of signal density or peak intensity in the m/z distribution of the incoming ion beam. In some examples, as explained above, signal density may be determined based on the peak-spacing approach or the summed-intensity approach for each individual m/z window. In some examples, the m/z range of interest is subdivided so that each m/z window 1102 has substantially the same signal density (e.g., within 5% of one another). However, in other examples the plurality of m/z windows do not have the same signal density. For instance, a user may have more interest in analytes in a particular m/z window (e.g., m/z window 1102-4) than analytes in other m/z windows 1102. Accordingly, the width of m/z windows 1102 encompassing analytes of interest may be set so as to have a higher signal density (and thus a narrower width) than other m/z windows to avoid multiple ion events and interferences in the m/z window of interest.

In some examples, the m/z range of interest is subdivided into a plurality of m/z windows 1102 based on intensity of peaks in the expected or measured m/z distribution of the incoming ion beam (e.g., ion stream 112-1). For example, the m/z range of interest may be subdivided into N windows 1102, where N is a positive integer, so that each of the N most intense peaks is located within a unique m/z window 1102. Alternatively, the m/z range of interest may be subdivided into m/z windows 1102 such that each peak having an intensity value greater than a threshold intensity value is located within a unique m/z window 1102. In some examples, the width of each m/z window 1102 is weighted based on factors such as total, maximum, average, or median peak intensity for the particular m/z window 1102.

In yet further examples, the division of the m/z range of interest into the plurality of m/z windows 1102 is performed, in whole or in part, based on user input. For example, m/z distribution graph 702 may be presented to a user by way of a display device associated with system 200. The user may provide input to specify the position and width of m/z windows 1102. In some examples, system 200 provides an initial or default configuration of m/z windows 1102 in any way described herein, which the user may adjust as desired.

In yet further examples, the division of the m/z range of interest into the plurality of m/z windows 1102 is performed at least in part based on available time. For example, if the mass analyzer (e.g., mass analyzer 106 or mass analyzer 910) requires a certain amount of time for the mass analysis, that time could limit the available injection time, if maximum time utilization is desired.

The ion population control parameter for each m/z window 1102 may be determined in any suitable way, including in any way described herein. For example, an AIC process as described herein (e.g., method 300, 400, or 500) may be performed independently for each m/z window 1102. In the example of FIG. 11, the accumulation time for m/z window 1102-4 encompassing the most intense peak 704 will be shorter than the accumulation times for other m/z windows 1102, which have less intense peaks and less signal density. Accordingly, the accumulation of ions in m/z window 1102-4 will not constrain or limit the accumulation of ions in the less dense m/z windows 1102 of the incoming ion beam. It will be recognized that the determination of the ion population control parameter for each m/z window 1102 is not limited to the AIC techniques described herein but can be determined in any other suitable way. For example, the ion population control parameter for a particular m/z window 1102 may be inversely proportional to the intensity (e.g., total, maximum, average, mean, etc.) of measured ion signal for the particular m/z window 1102. In some examples, the ion population control parameter for a particular m/z window 1102 may be set above a minimum value, below a maximum value, or may be set based on user input.

A distinct accumulation event is performed for each m/z window 1102 using the ion population control parameter for the corresponding m/z window 1102. For example, a first accumulation event may be performed for m/z window 1102-1 during which ions outside m/z window 1102-1 are filtered out by the mass filter (e.g., mass filter 802 or mass filter 904) and ions within m/z window 1102-1 are transmitted by the mass filter and accumulated in the ion store (e.g., ion store 104, ion trap 906, or collision cell 908) for the accumulation time determined for m/z window 1102-1. After the first accumulation event is completed, a second accumulation event may be performed for m/z window 1102-2 during which ions outside m/z window 1102-2 are filtered out by the mass filter and ions within m/z window 1102-2 are transmitted by the mass filter and accumulated in the ion store for the accumulation time determined for m/z window 1102-2. This process may be repeated for the remaining m/z windows 1102 until the last accumulation event is completed for the last m/z window 1102. In this way, a population of ions having a generally uniform distribution of ions across the m/z space is accumulated in the ion store due to the multiple, customized accumulation events. It will be recognized that any order of accumulation events may be used and need not to be performed in order of increasing or decreasing m/z of m/z windows 1102. In some examples, an accumulation event for a selected m/z window 1102 may be omitted or skipped, such as for an m/z window 1102 identified by a user (e.g., which may be of little or no interest to the user).

After accumulation of the population of ions in the ion store, the population of ions is transferred to the mass analyzer (e.g., mass analyzer 106 or mass analyzer 910) and mass analyzed. The resulting CDMS spectrum 1104 shows a greater number of signals in the less dense portions of the m/z space of m/z distribution graph 702 as compared with CDMS spectrum 706 while also preventing the multiple ion events and interferences of CDMS spectrum 708. With appropriate division of m/z windows and their respective ion population control parameters, a much larger number of ions can be injected into the mass analyzer while minimizing the risk of multiple ion events and interferences that would degrade the final quality of the CDMS spectrum. Accordingly, more ions per unit time can be analyzed, thus increasing sample throughput without reducing data quality. Additionally, the data quality may be higher than conventional CDMS techniques since the CDMS techniques using multiple accumulation events, as described herein, better characterizes the regions of m/z space of the incoming ion beam that have less signal density.

Moreover, the CDMS techniques incorporating multiple accumulation events enable CDMS to be performed with a pre-separation process, such as liquid chromatography. Conventional CDMS techniques typically are not performed in conjunction with a pre-separation process such as liquid chromatography due to the mismatch of time scales. For example, conventional CDMS techniques typically take longer than LC separations since LC peak widths are typically shorter than the time required to acquire a CDMS spectrum. However, the modified CDMS techniques described herein using multiple accumulation events shortens the time needed to acquire a CDMS spectrum, thus enabling CDMS to be performed in conjunction with pre-separation processes, such as liquid chromatography, gas chromatography, or capillary electrophoresis. For example, mass spectrometer 800 or 900 may be coupled with a liquid chromatography system including a column having a stationary phase that separates components included in the sample after the sample is injected into a mobile phase. An ion source of the mass spectrometer produces ions from the sample as the components included in the sample elute from the liquid chromatography system. The ions thus produced are introduced into the mass spectrometer for CDMS analysis.

In some CDMS methods, multiple CDMS spectra are combined, with the intensity at each m/z across the multiple CDMS spectra averaged, to provide a more accurate representation of the m/z distribution of ions in the incoming ion beam. However, as shown in FIG. 11, CDMS spectrum 1104 does not represent the m/z distribution of ions in the incoming ion beam (represented by m/z distribution graph 702) due to the nonuniform accumulation of ions across m/z windows 1102. For example, the accumulation time of m/z window 1102-4 will be shorter than the accumulation time of other m/z windows 1102 so as to obtain a more even distribution of ions. As a result, CDMS spectrum 1104 shows that each detected ion has the same intensity. Combining multiple spectra acquired in a similar manner will not result in an accurate representation of the actual m/z distribution of ions in the incoming ion beam. Moreover, the position of m/z windows and the ion control parameter for m/z windows may vary from spectrum to spectrum.

To account for the nonuniform accumulation of ions across m/z windows 1102, the intensity values of CDMS spectrum peaks in each m/z window 1102 may be adjusted (e.g., scaled or normalized) based on the ion population control parameter of the corresponding m/z window 1102 containing the peak(s). For example, the intensity values for an m/z window 1102 may be scaled based on the variance of the ion population control parameter for the m/z window 1102 relative to a reference ion population control parameter value. The reference ion population control parameter value may be preset or may be the ion population control parameter value for an m/z window 1102. For example, the accumulation time of m/z window 1102-3 may be three times the accumulation time of m/z window 1102-4. Accordingly, intensity values of signals in m/z window 1102-3 may be reduced by a factor of three. A similar adjustment may be performed for the other m/z windows 1102 using the accumulation time of m/z window 1102-4 as the reference value. In this way, a combined CDMS spectrum more accurately represents the m/z distribution of ions in the ion beam.

Various modifications may be made to the methods, apparatuses, and systems described herein. In some examples, system 200 may be configured to request user input to manage or adjust settings of the AIC methods. For example, system 200 may obtain, from a user, method settings, a list of target analytes, a selected m/z range, and/or any other initial or default values of parameters associated with method 300, 400, 500, and/or 600. System 200 may also be configured to notify the user of certain changes, such as when the accumulation time changes or changes by a threshold amount, or the need for changes, such as when an assessment indicates parameters (e.g., target signal density, accumulation time, etc.) should be adjusted.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 12:
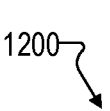
FIG. 12 shows an illustrative computing device that may be specifically configured to perform one or more of the operations, methods, and processes described herein.
Figure 12:
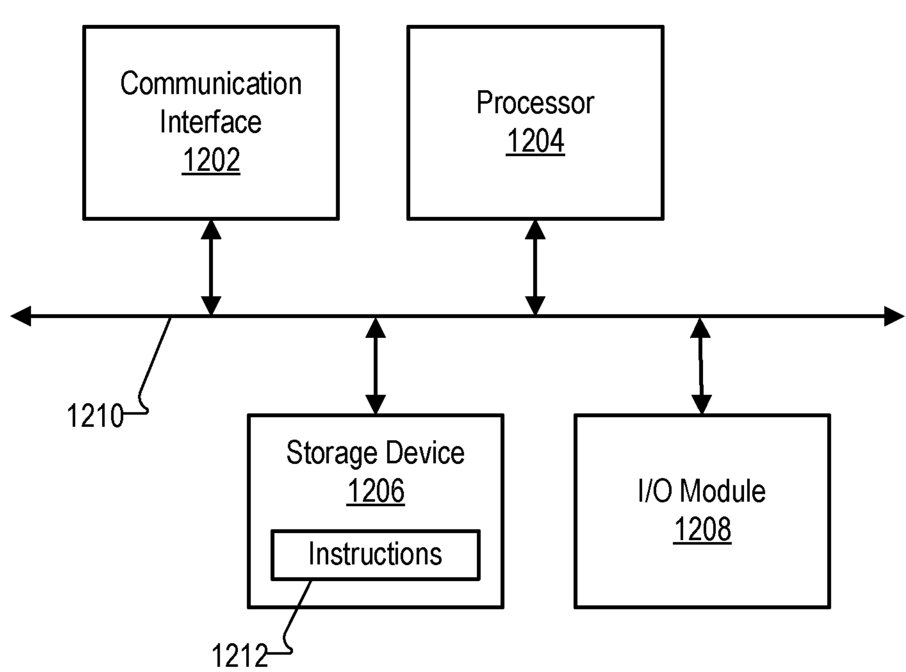

FIG. 12 shows an illustrative computing device 1200 that may be specifically configured to perform one or more of the operations, methods, and processes described herein. As shown in FIG. 12, computing device 1200 may include a communication interface 1202, a processor 1204, a storage device 1206, and an input/output ("I/O") module 1208 communicatively connected one to another via a communication infrastructure 1210. While an illustrative computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data and/or interpreting, executing, and/or directing execution of one or more of the instructions, processes, and/or operations described herein. Processor 1204 may perform operations by executing computer-executable instructions 1212 (e.g., an application, software, code, and/or other executable data instance) stored in storage device 1206.

Storage device 1206 may include one or more data storage media, devices, or configurations and may employ any type, form, and combination of data storage media and/or device. For example, storage device 1206 may include, but is not limited to, any combination of the non-volatile media and/or volatile media described herein. Electronic data, including data described herein, may be temporarily and/or permanently stored in storage device 1206. For example, data representative of computer-executable instructions 1212 configured to direct processor 1204 to perform any of the operations described herein may be stored within storage device 1206. In some examples, data may be arranged in one or more databases residing within storage device 1206.

I/O module 1208 may include one or more 1/O modules configured to receive user input and provide user output. One or more 1/O modules may be used to receive input for a single virtual experience. 1/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1200. For example, storage facility 202 may be implemented by storage device 1206, and processing facility 204 may be implemented by processor 1204.

In the preceding description, various illustrative embodiments and examples have been described with reference to the accompanying drawings. It will, however, be evident that various modifications and changes may be made thereto, and additional embodiments and examples may be implemented without departing from the scope of the subject matter set forth in the claims that follow. For example, certain features of one embodiment or example described herein may be combined with or substituted for features of another embodiment or example described herein. The description and drawings are accordingly to be regarded in an illustrative rather than a restrictive sense.

Advantages and features of the present disclosure can be further described by the following examples:

Example 1. A system for charge detection mass spectrometry (CDMS), comprising: one or more processors; and memory storing executable instructions that, when executed by the one or more processors, cause a computing device to direct a mass spectrometer to perform a process comprising: subdividing a mass-to-charge ratio (m/z) range of interest into a plurality of m/z windows; determining an ion population control parameter for each m/z window, wherein the ion population control parameter for each m/z window regulates a quantity of ions accumulated in an ion store during an accumulation event; accumulating, in the ion store by one or more accumulation events each corresponding to a distinct m/z window of the plurality of m/z windows, a population of ions derived from a sample, wherein during each accumulation event ions within an m/z window corresponding to the accumulation event are accumulated in the ion store based on the ion population control parameter for the corresponding m/z window; transferring the accumulated population of ions to a mass analyzer; and mass analyzing the population of ions to acquire a CDMS spectrum of the population of ions.

Example 2. The system of example 1, wherein the process further comprises adjusting intensity of a peak included in the CDMS spectrum based on the ion population control parameter for the m/z window containing the peak.

Example 3. The system of example 1 or 2, wherein the subdividing the m/z range of interest into the plurality of m/z windows is performed based on an m/z distribution of ions derived from the sample.

Example 4. The system of example 3, wherein the m/z distribution of ions derived from the sample is based on a pre-scan or a characterization analysis of the sample.

Example 5. The system of example 3 or 4, wherein the m/z distribution of ions derived from the sample is based on one or more previously acquired CDMS mass spectra of one or more populations of ions derived from the sample.

Example 6. The system of any of examples 3-5, wherein the subdividing the m/z range of interest into the plurality of m/z windows is performed based on at least one of signal density or peak intensity of the m/z distribution of ions.

Example 7. The system of any of examples 3-6, wherein: the ion population control parameter comprises an accumulation time over which ions are accumulated in the ion store during an accumulation event; and the accumulation time for each m/z window is inversely proportional to a summed intensity of peaks of the m/z distribution of ions within the m/z window.

Example 8. The system of any of examples 3-7, wherein the plurality of m/z windows have substantially a same signal density.

Example 9. The system of any of the foregoing examples, wherein the one or more accumulation events comprises a plurality of accumulation events corresponding to each m/z window of the plurality of m/z windows.

Example 10. The system of any of the foregoing examples, wherein the accumulating the population of ions in the ion store is performed during a mass analysis of a prior accumulated population of ions.

Example 11. A non-transitory computer-readable medium storing instructions that, when executed, direct at least one processor of a computing device for charge detection mass spectrometry to perform a process comprising: subdividing a mass-to-charge ratio (m/z) range of interest into a plurality of m/z windows; determining an ion population control parameter for each m/z window, wherein the ion population control parameter for each m/z window regulates a quantity of ions accumulated in an ion store during an accumulation event; directing accumulation, in the ion store by one or more accumulation events each corresponding to a distinct m/z window of the plurality of m/z windows, of a population of ions derived from a sample, wherein during each accumulation event ions within an m/z window corresponding to the accumulation event are accumulated in the ion store based on the ion population control parameter for the corresponding m/z window; directing transfer of the accumulated population of ions to a mass analyzer; and directing mass analysis of the population of ions to acquire a CDMS spectrum of the population of ions.

Example 12. The computer-readable medium of example 11, wherein the process further comprises adjusting intensity of a peak included in the CDMS spectrum based on the ion population control parameter for the m/z window containing the peak.

Example 13. The computer-readable medium of example 11 or 12, wherein the subdividing the m/z range of interest into the plurality of m/z windows is performed based on an m/z distribution of ions derived from the sample.

Example 14. The computer-readable medium of example 13, wherein: the ion population control parameter comprises an accumulation time over which ions are accumulated in the ion store during an accumulation event; and the accumulation time for each m/z window is inversely proportional to a summed intensity of peaks of the m/z distribution of ions within the m/z window.

Example 15. The computer-readable medium of example 13 or 14, wherein the plurality of m/z windows have substantially a same signal density.

Example 16. The computer-readable medium of any of examples 11-15, wherein the one or more accumulation events comprises a plurality of accumulation events corresponding to each m/z window of the plurality of m/z windows.

Example 17. A system for charge detection mass spectrometry (CDMS), comprising: an ion store that accumulates, by one or more accumulation events, a population of ions derived from a sample; a mass analyzer that acquires, by CDMS, a mass spectrum of the accumulated population of ions after the accumulated population of ions is transferred to the mass analyzer; a mass filter that selectively transmits ions derived from the sample based on m/z of the ions; and a computing device configured to perform a process comprising: subdividing a mass-to-charge ratio (m/z) range of interest into a plurality of m/z windows, wherein each accumulation event of the one or more accumulation events corresponds to a distinct m/z window of the plurality of m/z windows; determining an ion population control parameter for each m/z window, wherein the ion population control parameter for each m/z window regulates a quantity of ions accumulated in the ion store during a corresponding accumulation event; and directing accumulation, in the ion store by the one or more accumulation events, of the population of ions derived from the sample, wherein during each accumulation event ions within an m/z window corresponding to the accumulation event are accumulated in the ion store based on the ion population control parameter for the corresponding m/z window.

Example 18. The system of example 17, wherein the directing the accumulation of the population of ions comprises directing the mass filter to selectively transmit, during each accumulation event of the one or more accumulation events, ions within the m/z window corresponding to the accumulation event.

Example 19. The system of example 17 or 18, wherein: the mass analyzer comprises an orbital electrostatic ion trap mass analyzer or an electrostatic linear ion trap mass analyzer; and the ion store comprises a collision cell or a C-trap.

Example 20. The system of any of examples 17-19, further comprising: a liquid chromatography system comprising a column having a stationary phase that separates components included in the sample after the sample is injected into a mobile phase; and an ion source that produces the ions from the sample as the components included in the sample elute from the liquid chromatography system.

What is claimed is:

1. A system for charge detection mass spectrometry (CDMS), comprising:

one or more processors; and memory storing executable instructions that, when executed by the one or more processors, cause a computing device to direct a mass spectrometer to perform a process comprising:

subdividing a mass-to-charge ratio (m/z) range of interest into a plurality of m/z windows;

determining an ion population control parameter for each m/z window, wherein the ion population control parameter for each m/z window regulates a quantity of ions accumulated in an ion store during an accumulation event;

accumulating, in the ion store by one or more accumulation events each corresponding to a distinct m/z window of the plurality of m/z windows, a population of ions derived from a sample, wherein during each accumulation event ions within an m/z window corresponding to the accumulation event are accumulated in the ion store based on the ion population control parameter for the corresponding m/z window;

transferring the accumulated population of ions to a mass analyzer; and mass analyzing the population of ions to acquire a CDMS spectrum of the population of ions.

2. The system of claim 1, wherein the process further comprises adjusting intensity of a peak included in the CDMS spectrum based on the ion population control parameter for the m/z window containing the peak.

3. The system of claim 1, wherein the subdividing the m/z range of interest into the plurality of m/z windows is performed based on an m/z distribution of ions derived from the sample.

4. The system of claim 3, wherein the m/z distribution of ions derived from the sample is based on a pre-scan or a characterization analysis of the sample.

5. The system of claim 3, wherein the m/z distribution of ions derived from the sample is based on one or more previously acquired CDMS mass spectra of one or more populations of ions derived from the sample.

6. The system of claim 3, wherein the subdividing the m/z range of interest into the plurality of m/z windows is performed based on at least one of signal density or peak intensity of the m/z distribution of ions.

7. The system of claim 3, wherein:

the ion population control parameter comprises an accumulation time over which ions are accumulated in the ion store during an accumulation event; and the accumulation time for each m/z window is inversely proportional to a summed intensity of peaks of the m/z distribution of ions within the m/z window.

8. The system of claim 3, wherein the plurality of m/z windows have substantially a same signal density.

9. The system of claim 1, wherein the one or more accumulation events comprises a plurality of accumulation events corresponding to each m/z window of the plurality of m/z windows.

10. The system of claim 1, wherein the accumulating the population of ions in the ion store is performed during a mass analysis of a prior accumulated population of ions.

11. A non-transitory computer-readable medium storing instructions that, when executed, direct at least one processor of a computing device for charge detection mass spectrometry to perform a process comprising:

subdividing a mass-to-charge ratio (m/z) range of interest into a plurality of m/z windows;

determining an ion population control parameter for each m/z window, wherein the ion population control parameter for each m/z window regulates a quantity of ions accumulated in an ion store during an accumulation event;

directing accumulation, in the ion store by one or more accumulation events each corresponding to a distinct m/z window of the plurality of m/z windows, of a population of ions derived from a sample, wherein during each accumulation event ions within an m/z window corresponding to the accumulation event are accumulated in the ion store based on the ion population control parameter for the corresponding m/z window;

directing transfer of the accumulated population of ions to a mass analyzer; and directing mass analysis of the population of ions to acquire a CDMS spectrum of the population of ions.

12. The computer-readable medium of claim 11, wherein the process further comprises adjusting intensity of a peak included in the CDMS spectrum based on the ion population control parameter for the m/z window containing the peak.

13. The computer-readable medium of claim 11, wherein the subdividing the m/z range of interest into the plurality of m/z windows is performed based on an m/z distribution of ions derived from the sample.

14. The computer-readable medium of claim 13, wherein:

the ion population control parameter comprises an accumulation time over which ions are accumulated in the ion store during an accumulation event; and the accumulation time for each m/z window is inversely proportional to a summed intensity of peaks of the m/z distribution of ions within the m/z window.

15. The computer-readable medium of claim 13, wherein the plurality of m/z windows have substantially a same signal density.

16. The computer-readable medium of claim 11, wherein the one or more accumulation events comprises a plurality of accumulation events corresponding to each m/z window of the plurality of m/z windows.

17. A system for charge detection mass spectrometry (CDMS), comprising:

an ion store that accumulates, by one or more accumulation events, a population of ions derived from a sample;

a mass analyzer that acquires, by CDMS, a mass spectrum of the accumulated population of ions after the accumulated population of ions is transferred to the mass analyzer;

a mass filter that selectively transmits ions derived from the sample based on m/z of the ions; and a computing device configured to perform a process comprising:

subdividing a mass-to-charge ratio (m/z) range of interest into a plurality of m/z windows, wherein each accumulation event of the one or more accumulation events corresponds to a distinct m/z window of the plurality of m/z windows;

determining an ion population control parameter for each m/z window, wherein the ion population control parameter for each m/z window regulates a quantity of ions accumulated in the ion store during a corresponding accumulation event; and directing accumulation, in the ion store by the one or more accumulation events, of the population of ions derived from the sample, wherein during each accumulation event ions within an m/z window corresponding to the accumulation event are accumulated in the ion store based on the ion population control parameter for the corresponding m/z window.

18. The system of claim 17, wherein the directing the accumulation of the population of ions comprises directing the mass filter to selectively transmit, during each accumulation event of the one or more accumulation events, ions within the m/z window corresponding to the accumulation event.

19. The system of claim 17, wherein:

the mass analyzer comprises an orbital electrostatic ion trap mass analyzer or an electrostatic linear ion trap mass analyzer; and the ion store comprises a collision cell or a C-trap.

20. The system of claim 17, further comprising:

a liquid chromatography system comprising a column having a stationary phase that separates components included in the sample after the sample is injected into a mobile phase; and an ion source that produces the ions from the sample as the components included in the sample elute from the liquid chromatography system.

* * * * *